United States Patent [19]
Taguchi et al.

[11] Patent Number: 5,505,483
[45] Date of Patent: Apr. 9, 1996

[54] AIRBAG SAFETY MODULE FOR VEHICLE

[75] Inventors: Masahiro Taguchi, Aichi; Kazutaka Katoh; Kazuo Sakakibara, both of Okazaki; Shigenori Kobayashi, Aichi; Naoki Nakane, Toyota; Toshiaki Matsuhashi, Gamagoori, all of Japan

[73] Assignee: Nippondenso Co., Ltd., Kariya, Japan

[21] Appl. No.: 233,751

[22] Filed: Apr. 26, 1994

[30] Foreign Application Priority Data

| Apr. 28, 1993 | [JP] | Japan | 5-102874 |
| Aug. 6, 1993 | [JP] | Japan | 5-196466 |
| Dec. 24, 1993 | [JP] | Japan | 5-328380 |

[51] Int. Cl.$^6$ .......................... B60R 21/20; B60R 21/32
[52] U.S. Cl. .................. 280/728.2; 280/728.3; 280/731; 280/735
[58] Field of Search .............. 280/731, 728 A, 280/728 B, 735, 734, 728 R, 736, 741, 740, 739, 738, 743 R, 732, 728.2, 728.3, 728.1, 743.1

[56] References Cited

U.S. PATENT DOCUMENTS

| 3,745,523 | 7/1973 | Lewis et al. | 280/735 |
| 4,158,191 | 6/1979 | Rogers et al. | 280/735 |
| 4,278,638 | 7/1981 | Nilsson et al. | 280/736 |
| 4,828,286 | 5/1989 | Fohl | 280/731 |
| 4,938,504 | 7/1990 | Fukuda et al. | 280/731 |
| 5,094,476 | 3/1992 | Chihaya | 280/731 |
| 5,167,427 | 12/1992 | Baba | 280/728 A |
| 5,201,541 | 4/1993 | Jones et al. | 280/731 |
| 5,257,816 | 11/1993 | Sugimoto et al. | 280/731 |
| 5,297,813 | 3/1994 | Baba et al. | 280/728 R |

FOREIGN PATENT DOCUMENTS

| 2711192 | 9/1978 | Germany | 280/735 |
| 0212643 | 8/1989 | Japan | 280/728 A |
| 2-28037 | 1/1990 | Japan | 280/731 |
| 3157242 | 7/1991 | Japan | 280/735 |
| 3292236 | 12/1991 | Japan | 280/743 R |
| 4055142 | 2/1992 | Japan | 280/728 A |
| 4201762 | 7/1992 | Japan | 280/735 |
| 4342638 | 11/1992 | Japan | 280/735 |
| 4353049 | 12/1992 | Japan | 280/728 B |

Primary Examiner—Margaret A. Focarino
Assistant Examiner—Peter C. English
Attorney, Agent, or Firm—Cushman, Darby & Cushman

[57] ABSTRACT

An airbag safety module for automotive vehicles is provided. This module includes a box-like cover and a housing. The cover incorporates therein an airbag, an inflator, and an airbag control unit and has a plurality of openings formed in its side wall. The housing includes a base wall on which the airbag and the inflator are mounted and a side wall having thereon a plurality of protrusions engageble with the openings of the cover, respectively to complete the airbag safety module. Each of the protrusions is shaped to allow the housing to be inserted into the cover in an assembling direction of completing the airbag safety module to engage one of the openings of the cover while restricting the cover from being disengaged from the housing in a disassembling direction opposite to the assembling direction.

35 Claims, 20 Drawing Sheets

／5,505,483

AIRBAG SAFETY MODULE FOR VEHICLE

BACKGROUND OF THE INVENTION

1. Technical Field of the Invention

The present invention relates generally to an airbag safety module for automotive vehicles. More particularly, the invention is directed to an improved mounting structure of a cover on a housing of an airbag safety module.

2. Background Art

It is well known in the art that an airbag safety module having disposed therein an inflator generating gas for inflating an airbag and an electronic control unit activating the inflator upon occurrence of an accidental collision, is mounted in a cone portion on a boss of a steering wheel.

In one such a conventional airbag safety module, an electronic control unit is bolted directly to a steering wheel. An inflator is arranged above the electronic control unit in electric communication therewith through a connector cable. An airbag is attached to a periphery of the inflator using a retainer. The retainer is bolted to a stay secured to a steering wheel through vises together with a cover incorporating therein the folded airbag.

The conventional airbag safety module, as described above, connects the electronic control unit with the inflator through the connector cable so that space is required for arranging the connector cable between the electronic control unit and the inflator, thereby increasing the extent to which the airbag safety module projects from the steering wheel. In addition, since the inflator, the electronic control unit, and the cover are separately secured to the steering wheel, a large number of fasteners are required, thereby increasing assembling processes which leads to increased manufacturing costs.

SUMMARY OF THE INVENTION

It is therefore a principal object of the present invention to avoid the disadvantages of the prior art.

It is another object of the present invention to provide an improved mounting structure of a cover incorporating therein a folded airbag, and a housing of an airbag safety module which is easily assembled without any fasteners.

According to one aspect of the present invention, an air airbag safety module for a vehicle is provided which comprises an inflatable airbag, an airbag inflator which responds to an airbag control signal, an airbag control unit operable to provide an airbag control signal to the inflator in response to impact acting on a vehicle body, a cover including a base enclosing the airbag, the inflator, and the airbag control unit therein. A housing is also provided, having disposed therein the airbag control unit, the housing including a base wall on which the airbag and the inflator are mounted and a side wall having engagable with the cover, respectively to complete the airbag safety module, each of the protrusions being shaped to allow the housing to be inserted into the cover in an assembling direction and to restrict the cover from being disengaged from the housing in a disassembling direction opposite to the assembling direction.

In a preferred mode, each of the protrusions of the housing has a tapered surface formed thereon to allow the housing to be inserted into the cover in the assembling direction to engage a respective opening provided in the cover.

In addition, each of the protrusions formed on the housing is shaped to allow the cover to be elastically deformed upon the insertion of the housing into the cover in the assembling direction to establish tight engagement with one of the respective openings of the cover.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
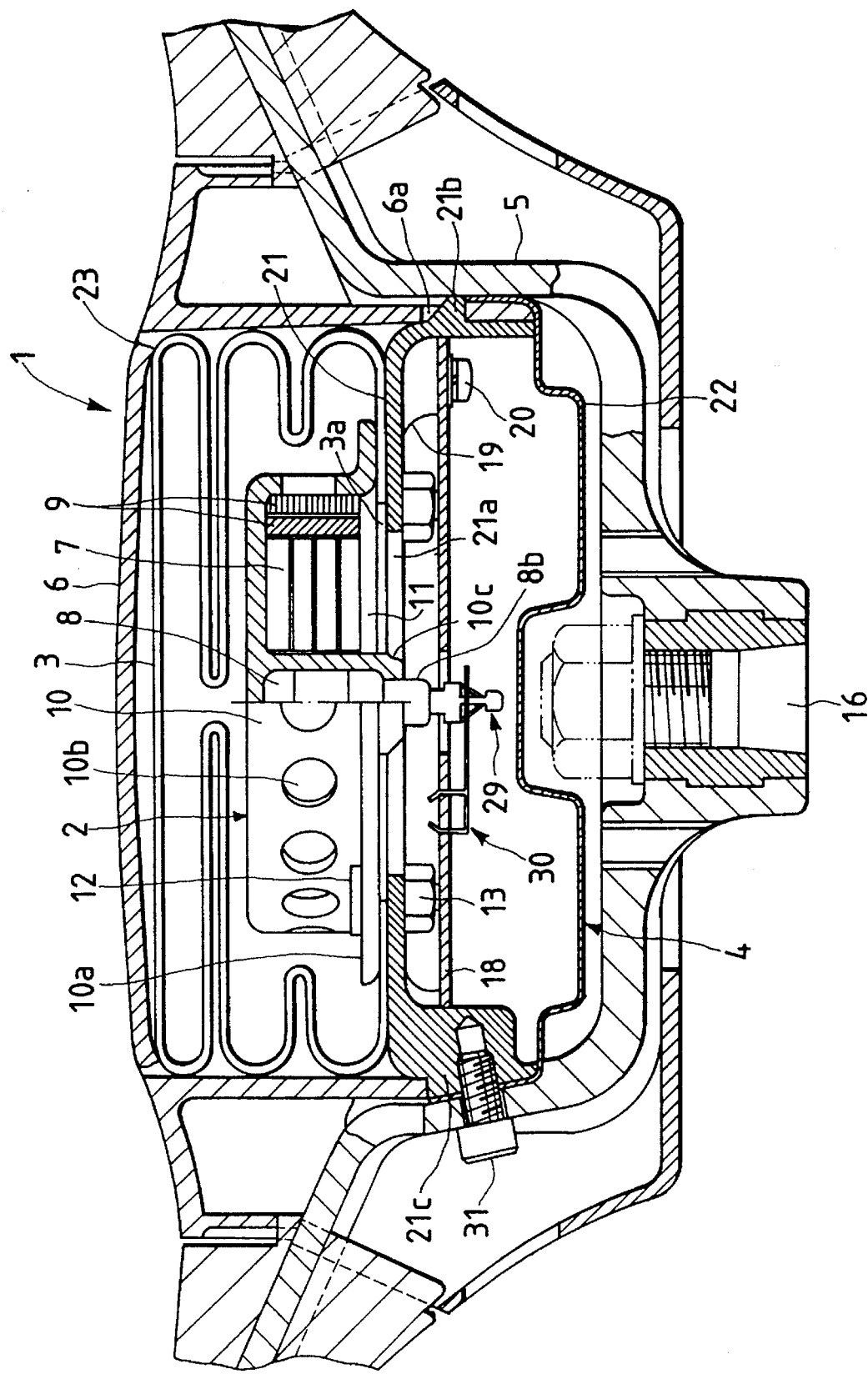
FIG. 1 is a cross-sectional view which shows an airbag safety module for automotive vehicles according to the present invention.

Referring now to the drawings, wherein like numbers refer to like parts in several views, particularly to FIG. 1, an airbag safety module 1 (often referred to as an occupant restraint device) is shown according to the present invention. FIG. 1 is a cross sectional view taken along the line I—I of FIG. 16.

The airbag safety module 1 generally includes an inflatable airbag 3, an inflator 2 for discharging gas into the airbag upon occurrence of accidental collision, and an electronic control unit 4 (hereinafter referred to as ECU) for activating the inflator. An outer decorative box-like cover 6 provided with a pad faces an interior of the vehicle, and covers the inflator 2, the airbag 3, and the ECU 4, which are disposed in a housing secured to a steering wheel 5.

The inflator 2 includes a gas generator 7 for generating gas upon combustion, an igniter (also called a squib) 8 activating the gas generator, a filter 9 for removing solid impurities contained in the generated gas and for lowering the temperature of the gas, and a disklike cylindrical casing 10 surrounding the gas generator 7, the igniter 8, and the filter 7. The casing 10 has a flange 10a constructed as shown in FIG. 2 and a bottom plate 11.

The casing 10 has a plurality of gas outlets 10b formed in a side wall for discharging gas generated by the gas generator 7. The casing 10 also has an igniter storage cylinder 10c extending downward from the central portion of casing 10, as viewed in the drawing.

Figure 12:
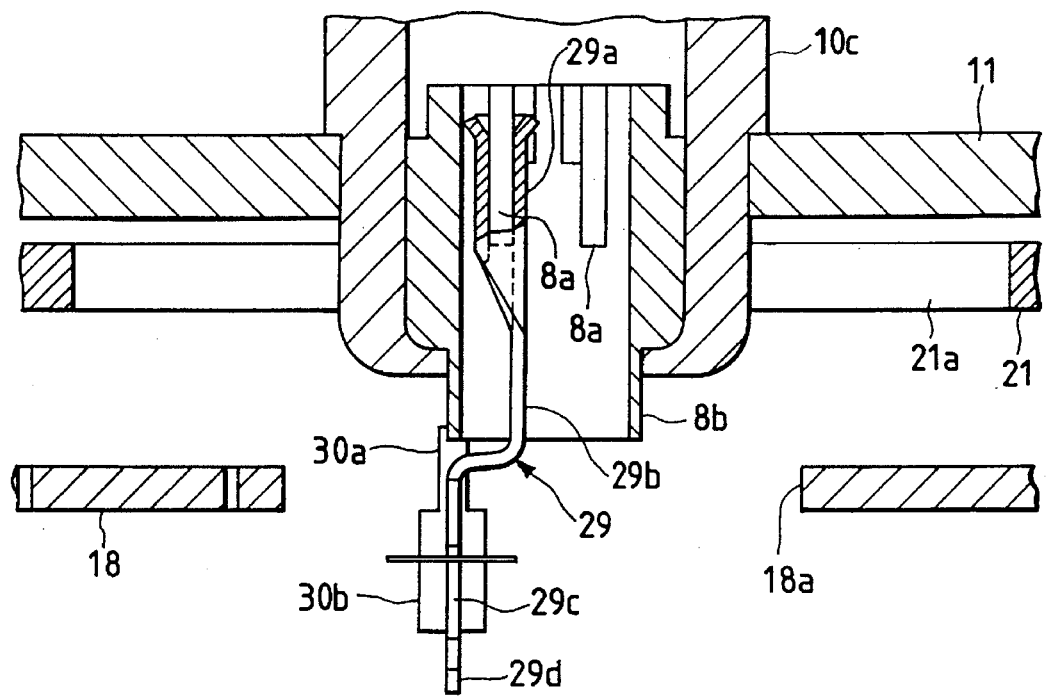
FIGS. 12 and 13 are partially cross-sectional views which show electric communication between an igniter and an ECU.
Figure 13:
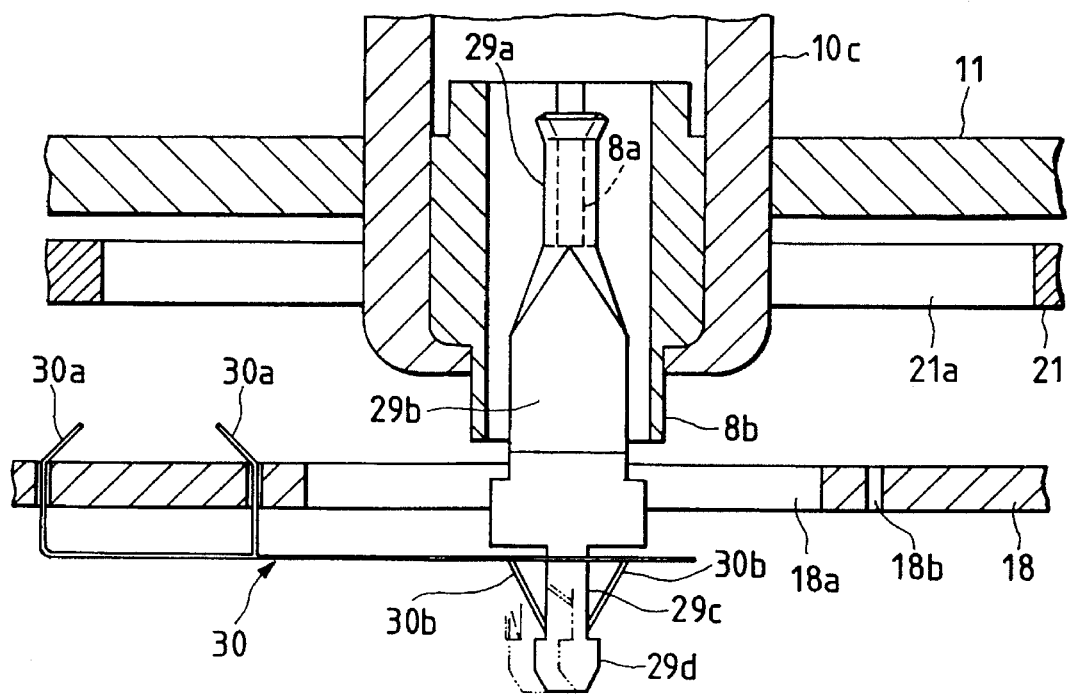

The igniter 8, as shown in FIGS. 12 and 13, includes a pair of terminals 8a electrically communicating with the ECU 4, and a cylindrical terminal retainer 8b which partially projects from the igniter storage cylinder 10c.

Figure 2:
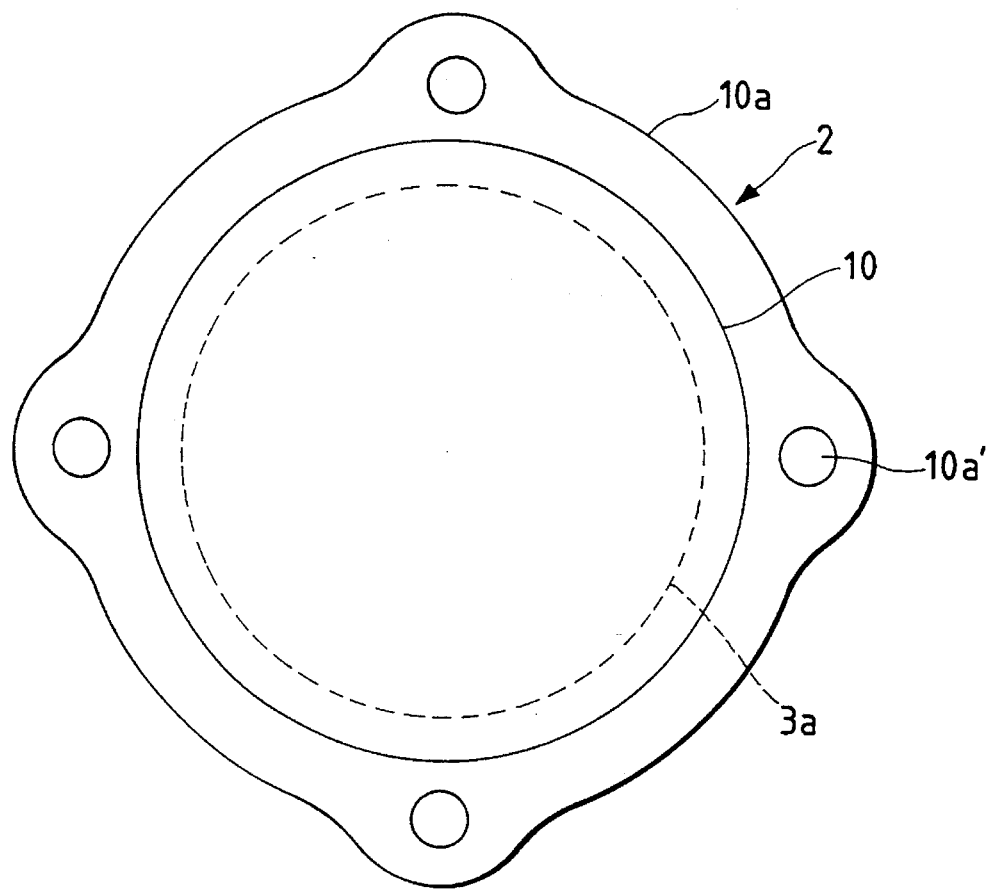
FIG. 2 is a plan view which shows a flange of an inflator.
Figure 6:
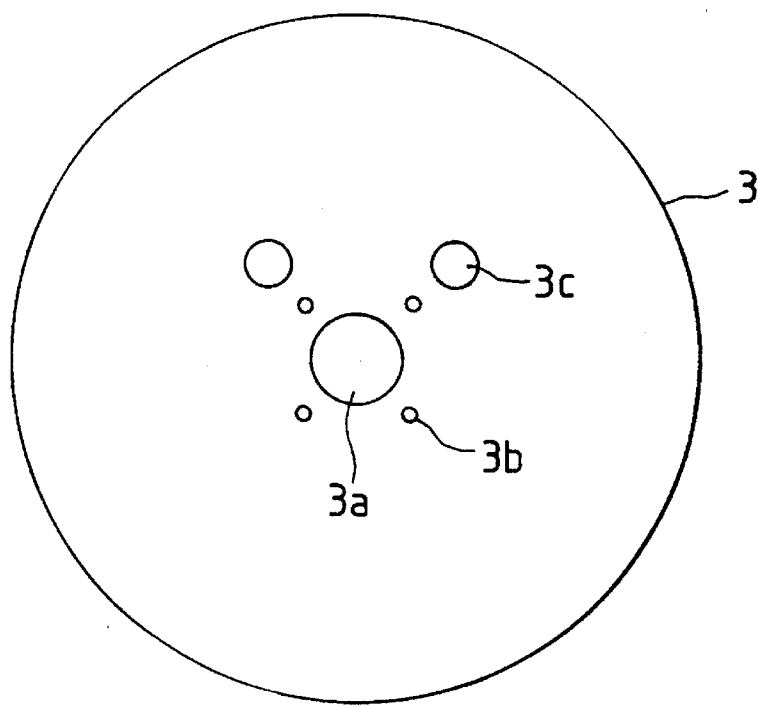
FIG. 6 is a bottom plan view which shows a bottom of an airbag mounted to an ECU.

The flange 10a, as seen from FIG. 1, extends radially outward from a lower periphery of the casing 10 and is, as shown in FIG. 2, of generally circular configuration similar to an inflator insertion hole 3a, as shown in FIG. 6, formed in the airbag 3. Therefore, it is possible to hold a peripheral portion of the inflator insertion hole 3a of the airbag 3 uniformly with the entire surface of the flange 10a, thereby preventing the airbag 3 from being torn when inflated.

Figure 3:
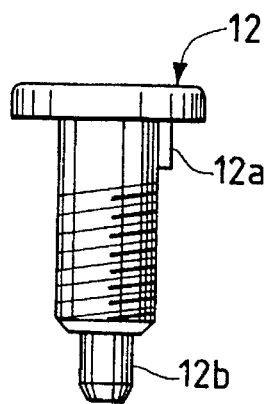
FIG. 3 is a side view which shows a bolt attached to the flange, as shown in FIG. 2.

Four bolts 12 are attached to the flange 10a for mounting the inflator 2 on the ECU 4. The bolts 12, as shown in FIG. 3, each have a locking key 12a which is press-fitted into a bolt hole 10a' formed in the flange 10a. The press-fitting of the locking key 12a causes the bolt hole 10a' to be deformed plastically to form a key groove for locking the bolt 12 tightly.

Figure 4:
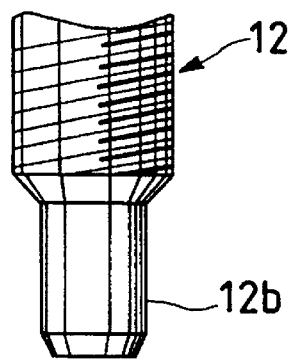
FIGS. 4 and 5 are partial side views which show an end portion of the bolt, as shown in FIG. 3.
Figure 5:
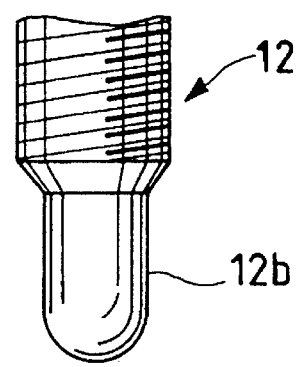

Each of the bolts 12, as shown in FIG. 4, has a small-diameter guiding end portion 12b. The guiding end portion 12b is designed to guide a nut 13 for providing for ease of insertion of the bolt 12 during assembly of the airbag safety module 1. The guiding end portion 12b has an edge chamfered or otherwise rounded, as shown in FIGS. 3–5 for preventing the airbag 3 from being scratched by the end of the bolt 12 when the inflator 2 is inserted into the airbag 3.

The bottom plate 11 of the casing 10 is of generally circular shape and has a circular opening in its center from which the end of the igniter storage cylinder 10c extends outward. The bottom plate 11 is welded to the casing 10 flush with the flange 10a without any difference in level therebetween.

The airbag 3, as shown in FIG. 6, has the inflator insertion hole 3a, four bolt holes 3b through which the bolts 12 attached to the flange 10a of the inflator 2 are inserted, respectively, and two gas outlets 3c for draining gas therefrom. The inflator insertion hole 3a, as already mentioned, is of generally circular configuration having a minimum diameter sufficient for permitting the flange 10a and the bolts 12 of the inflator 2 to be inserted easily into the airbag 3.

The bolt holes 3b of the airbag 3 are formed around the inflator insertion hole 3a at regular intervals. The gas outlets 3c are provided for draining gas from the airbag 3 when being inflated to restrain an occupant's body against a seat upon occurrence of accidental collision. A reinforcing fabric (not shown) is stitched inside the airbag 3 around the inflator insertion hole 3a, the bolt holes 3b, and the gas outlets 3c.

Figure 7:
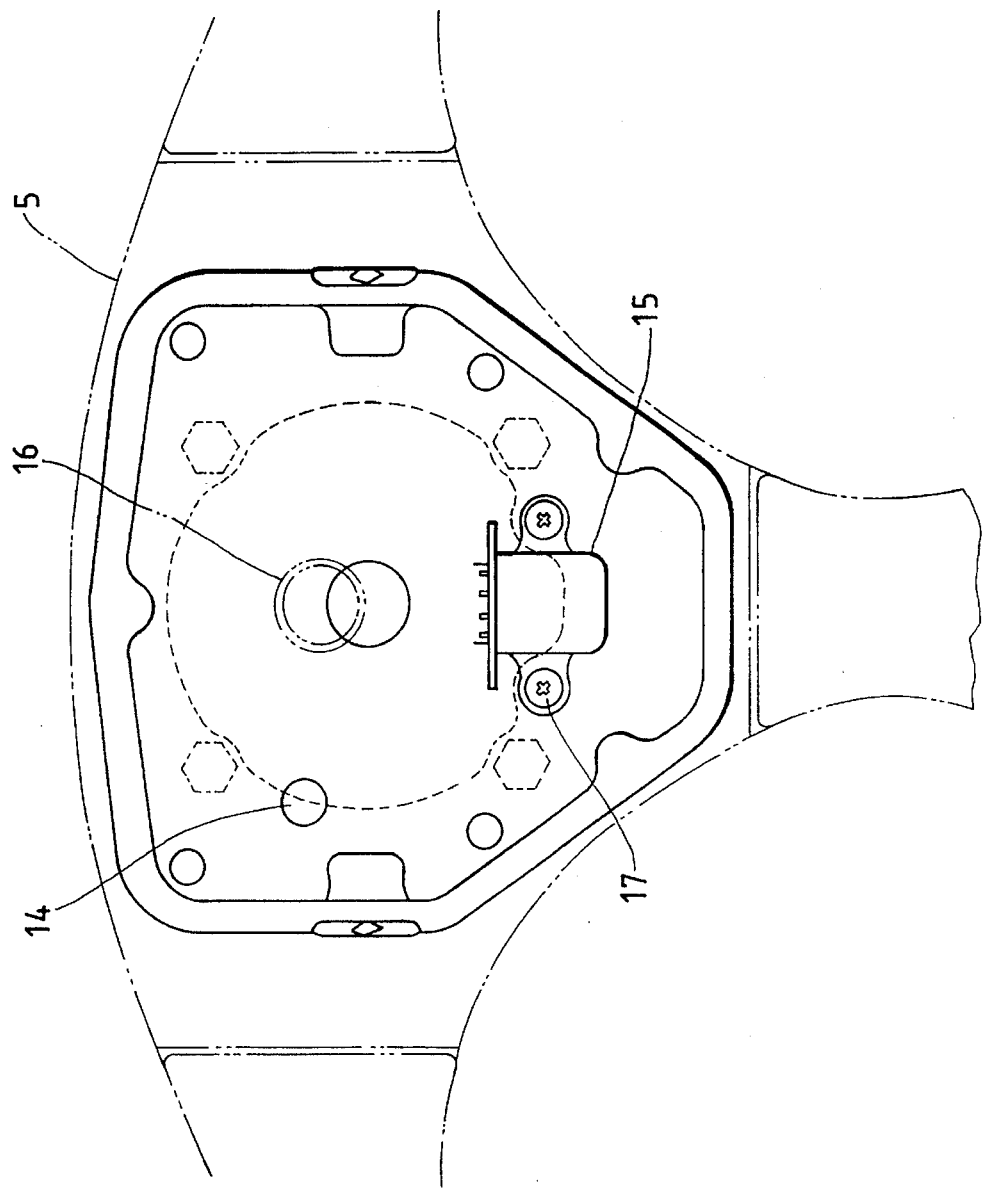
FIG. 7 is a plan view which shows arrangement of acceleration sensors in an ECU.

The ECU 4, as shown in FIG. 7, includes an electronic acceleration sensor 14, a mechanical acceleration sensor 15, and a collision detecting circuit (not shown) responsive to an output signal from the acceleration sensor 14 to determine occurrence of vehicle collision. An ignition circuit (not shown) responds to an output signal from the collision detecting circuit to provide a starting (i.e., ignition) signal to the igniter 8 of the inflator 2.

The mechanical acceleration sensor 15 includes an inertial member which strokes along a given path of travel according to acceleration acting on the vehicle body to determine the degree of acceleration based on the amount of movement thereof. The mechanical acceleration sensor therefore requires sufficient length to allow the inertial member to be displaced in an acceleration direction. Therefore, the mechanical acceleration sensor 15 is arranged at a location inside the ECU 4 offset from a steering shaft 16 of the steering wheel 5. In addition, the mechanical acceleration sensor 15 is fixed by means of screws 17 on a boss (not shown) formed inside the ECU 4 and is oriented to have the inertial member displaced parallel to the steering shaft 16 of the steering wheel 5 for maintaining constant sensitivity.

The collision determining circuit and the ignition circuit of the ECU 4 are mounted on a circuit board 18, as shown in FIG. 1, together with a power source and a failure detecting circuit (both not shown). The circuit board 18 is secured on a boss 19 formed on a housing, as will be referred to hereinafter in detail, of the ECU 4, using screws 20 (only one is shown).

Figure 16:
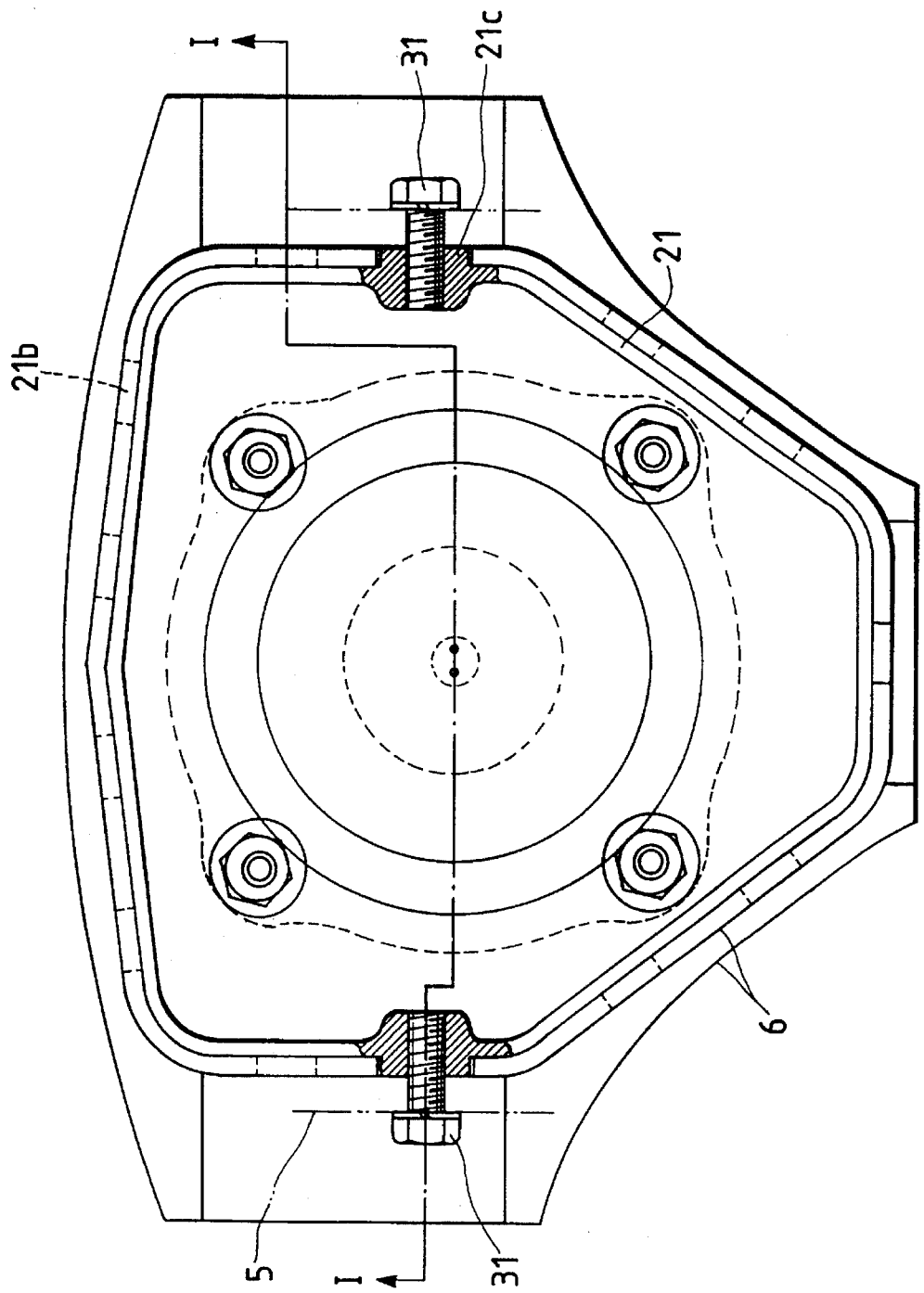
FIG. 16 is a plan view which shows the securement of a cover on a housing of an ECU.

The housing of the ECU 4 includes a cap-like housing body 21 and a bottom cover 22. The housing body 21 has a circular mounting hole 21a formed in the central portion of its upper base wall and four bolt holes (not shown) formed around the mounting hole 21a for receiving the bolts 12 attached to the flange 10a of the inflator 2. The mounting hole 21a of the housing body 21 enables electric connection between the circuit board 18 and the igniter 8 in the inflator 2, and is greater in size than an outer diameter of the igniter storage cylinder 10c. On a side wall of the housing body 21, a plurality of barb-like protrusions 21b, as shown in FIGS. 1 and 16, which are shaped to tightly engage the pad 6, are formed. The side wall includes two thick-walled mounting portions 21c which are diametrically opposite to each other with respect to the center of the housing body 21.

The cover 22 is mounted using screws (not shown) on the housing body 21 in which the inflator 2 and the airbag 3 are already been disposed. The peripheral edge of the cover 22 is, as can be seen from the drawing, folded to retain a peripheral edge of the pad 6 tightly on the side wall of the housing body 21. This prevents a side wall of the pad 6 from being dislodged easily from the housing body 21 when the airbag is inflated.

Figure 8:
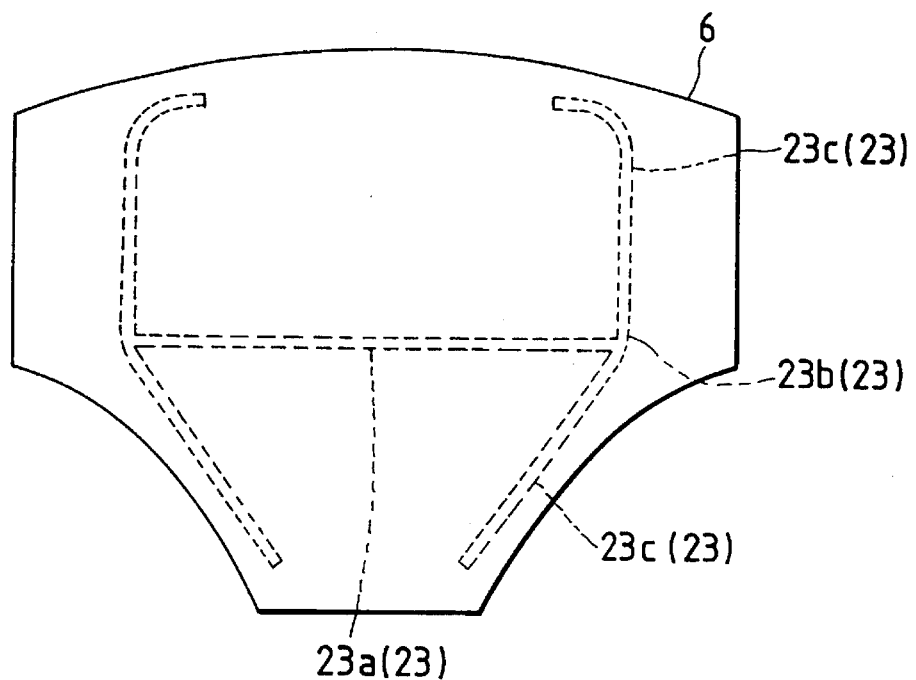
FIG. 8 is a plan view which shows an outer wall of a cover with a rip groove.
Figure 9:
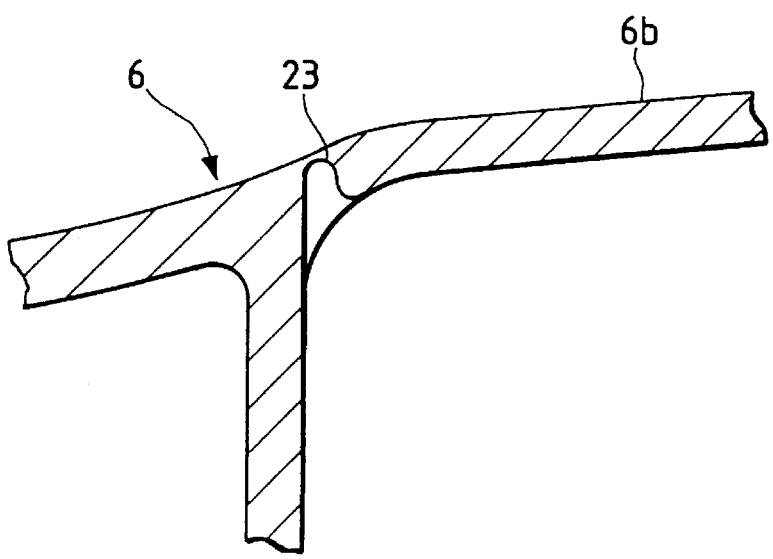
FIG. 9 is a partially cross-sectional view which shows location of a rip groove formed in an outer wall of a cover.

The pad 6 has, as shown in FIG. 9, a rip line, or groove 23 formed in an inner surface of its outer wall 6b for ease of ripping of the outer wall out of the pad 6 upon inflation of the airbag 3. The complete rip groove 23, as shown in FIG. 8, is substantially H-shaped and includes some sections having different thicknesses. In practice, the rip groove 23 is formed with a horizontal rip section 23a, two rip line-connecting sections 23b, and four vertical rip sections 23c. The horizontal rip section 23a extends horizontally, as viewed in the drawing and is thinner than the vertical rip sections 23c and the rip line-connecting sections 23b. The vertical rip sections 23c extend generally vertically on both sides of the horizontal rip section 23a and are thicker than any other sections. The rip line-connecting sections 23b connect the horizontal rip sections 23a with the vertical rip sections 23c. Therefore, upon the inflation of the airbag 3, the horizontal rip section 23a is first torn due to its thinness, followed by the rip line-connecting sections 23b and the vertical rip sections 23c.

The rip line-connecting sections 23b and the vertical rip sections 23c are, as shown in FIG. 9, formed in a curved portion continuing to the side wall of the pad 6. With this arrangement, it becomes possible to increase intervals between the rip line-connecting sections 23b and between the vertical rip sections 23c, as compared with conventional arrangements, to provide an increased area of the outer wall 6b (i.e., an opening area when the outer wall is removed upon inflation of the airbag 3) of the pad 6. In addition, the amount of deformation of the pad 6 when it is molded is reduced while the rigidity of the outer wall 6b is improved.

In the side wall of the pad 6, a plurality of rectangular holes 6a are formed for engaging the barb-like protrusions 21b of the housing body 21. The pad 6 is installed without any attachments (such as screws, bolts, or rivets) by mounting it on the housing body 21 of the ECU 4 to have the side wall of the housing body 21 elastically deformed so that the holes 6a may engage the barb-like protrusions 21b.

Figure 10:
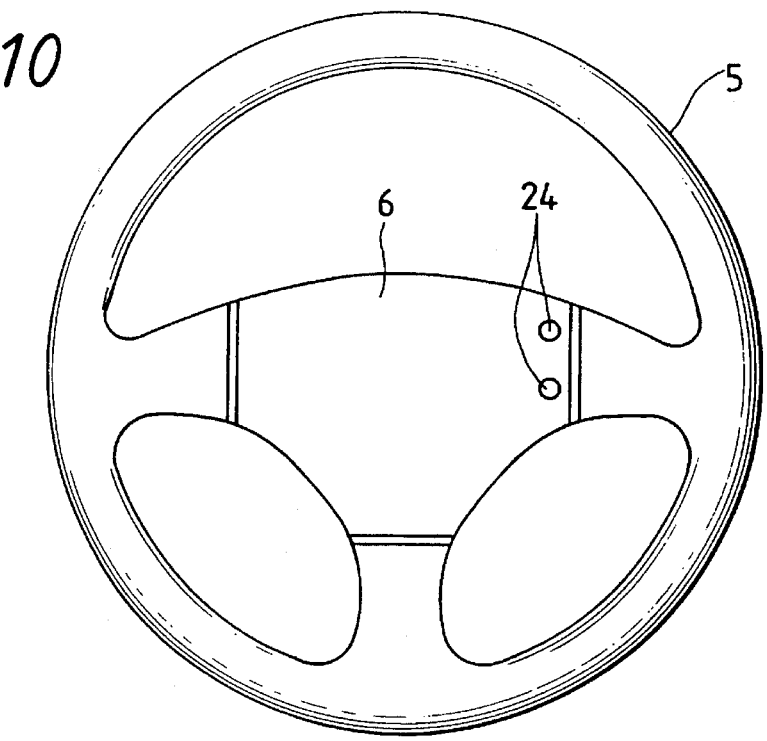
FIG. 10 is a plan view which shows a steering wheel with alarm lamps informing a driver of occurrence of a system failure.
Figure 11:
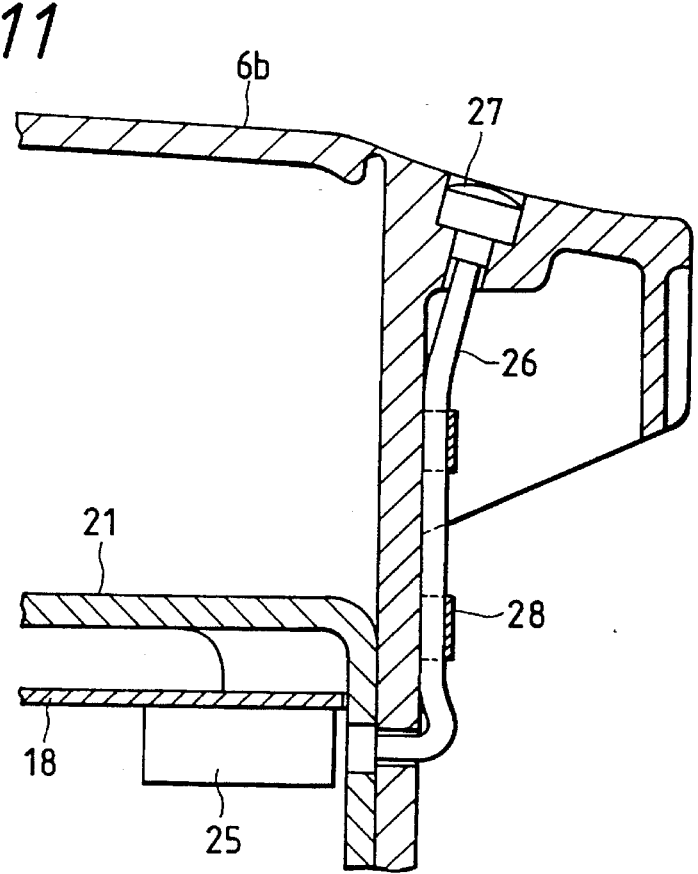
FIG. 11 is a partially cross-sectional view which shows a mounting structure of an alarm lamp in a cover.

In the outer wall 6b of the pad 6, two alarm lamps 24, as shown in FIG. 10, which warn a driver of occurrence of a failure, are arranged. One alarm lamp is intended for the airbag safety module 1 for the driver, and the other is for a similar airbag safety module for a front passenger. The alarm lamps 24 may be either electrically communicated with the ECU 4 through wiring, or optically connected to the ECU 4 through an optical fiber 26, as seen in FIG. 11. The optical fiber 26 transmits light projected from a light emitting diode (LED) 25 incorporated in the ECU 4 to a diffusion lens 27 fitted in the outer wall 6b of the pad 6. The optical fiber 26 may be retained by clips 28 integrally formed with the side wall of the pad 6. This eliminates the need for electric wiring, resulting in greatly improved installation of the airbag safety module 1.

Figure 14:
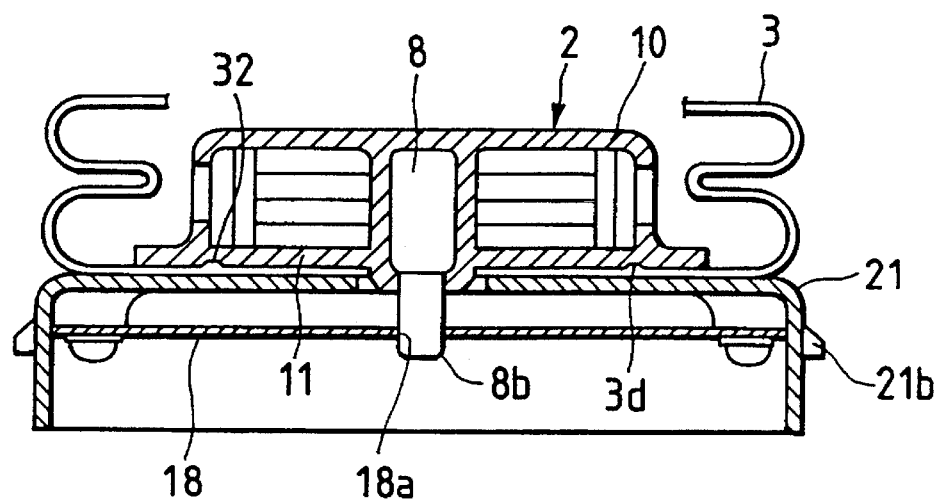
FIG. 14 is a cross-sectional view which shows a mounting structure of an inflator on a housing of an ECU.
Figure 27:
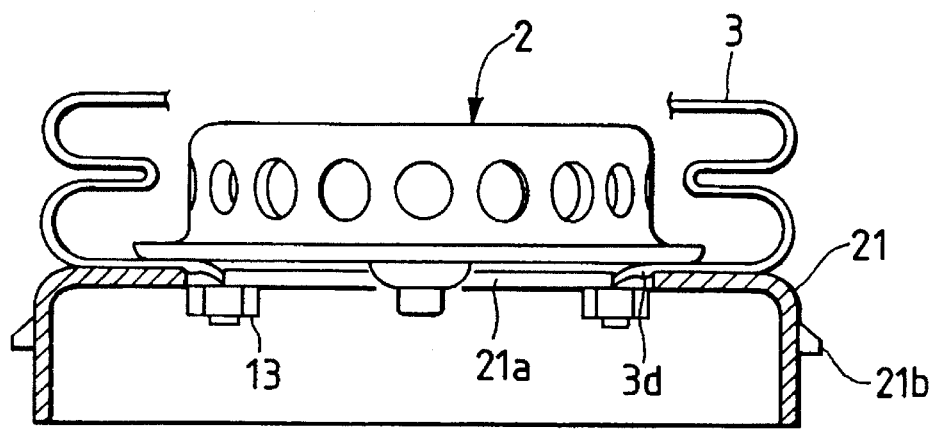
FIG. 27 is a cross-sectional view which shows an alternative mounting structure of mounting an airbag between an inflator and a housing of an ECU.

In assembling, the inflator 2 is initially inserted into the airbag 3 through the inflator insertion hole 3a and then the bolts 12 attached to the flange 10a of the inflator 2 are inserted through the bolt holes 3b around the inflator insertion hole 3a. Subsequently, the bolts 12 are inserted into the bolt holes (not shown) of the housing body 21 of the ECU 4 and the nuts 13 are fastened to the bolts 12 projected inwardly of the housing body 21. In this manner, the airbag 3 is retained in the module with the peripheral portion around the inflator insertion hole 3a being sandwiched between the bottom surface (i.e., the flange 10a) of the inflator 2 and the housing body 21 of the ECU 4. It is advisable that the airbag 3 be so arranged that stitched portions, or seams 3d, as shown in FIGS. 14 and 27, of the airbag 3 do not overlap with a welded portion between the casing 10 of the inflator 2 and the bottom plate 11. The seams 3d of the airbag 3 are formed at an edge of the inflator insertion hole 3a (to avoid fraying) and at the above described reinforcing fabric stitched on the inner surface of the airbag 3, both creating corresponding bulges.

If only the seams 3d are pressed between the inflator 2 and the ECU 4, a decreased area of the airbag 3 is retained, which, in turn, reduces the force holding the airbag 3. In addition, when the airbag 3 is locally retained, it will cause stress to be concentrated on the seams 3d to induce the airbag 3 to be broken easily. Accordingly, in the airbag safety module 1 of the present invention, the airbag 3 is, as discussed above, secured on the ECU 4 with the seams 3d being offset from the welded portion of the inflator 2. With this arrangement, the airbag 3 can be tightly retained on the housing 21 of the ECU 4 and the concentration of stress on the seams 3 is mitigated for preventing the airbag 3 from being torn.

After the airbag 3 has been retained on the upper base wall of the housing body 21, the igniter 8, disposed in the inflator 2, is electrically connected to the ECU 4 by way of a pair of terminals 29, as shown in FIGS. 12 and 13, (only one is shown for the sake of simplicity). Each terminal 29 connects one of the terminals 8a of the igniter 8 are connected to a pair of terminals 30 (only one is shown) of the circuit board 18 of the ECU 4.

Each of the terminals 29 includes a cylindrical socket 29a for receiving a corresponding terminal 8a, a strip portion 29b extending from the socket 29a, a neck portion 29c, and a head portion 29d. The strip portion 29b is curved to orient the head portion 29d outward for easy connection between the terminals 29 and the terminals 30. Between the terminals 8a of the igniter 8, a resin-made insulating member (not shown) is interposed to prevent short-circuiting therebetween. In addition, a window 18a is formed in the circuit board 18 for visual inspection of the connection between the terminals 8a of the igniter 8 and the terminals 29.

Each of the terminals 30 of the circuit board 18 is made of a thin and long plate including connecting leg portions 30a inserted into connection holes 18b of the circuit board 18 and a pair of connecting portions 30b formed by cutting part of the plate and bending it at a given angle.

The connection between the terminal 29 and the terminal 30 is accomplished by inserting the head portion 29d between the connecting portions 30b into elastically tight engagement therewith. The head portion 29d is thus prevented from being dislodged under the elastic reaction forces from the connecting portions 30b. Additionally, this construction of connection advantageously tolerates a certain degree of lateral misalignment, between the terminal 29 and the terminal 30 as shown by broken lines in FIG. 13 between the terminal 29 and the terminal 30.

Figure 15:
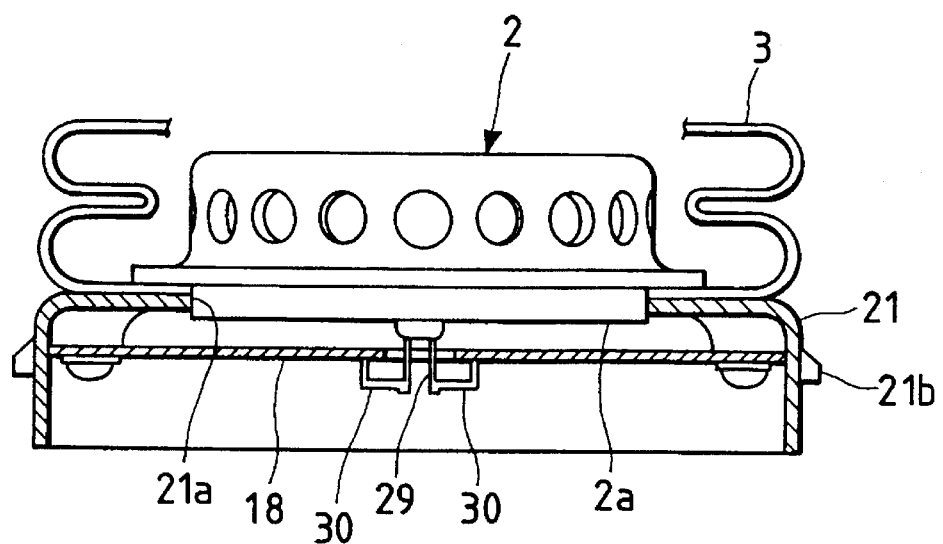
FIG. 15 is a cross-sectional view which shows an alternative mounting structure of an inflator on a housing of an ECU.

In order to accurately align the terminals 29 of the igniter 8 with the terminals 30 of the circuit board 18 for connection therebetween, the terminal retainer 8b of the igniter 8 preferably extends downward, as shown in FIG. 14, for engagement with a hole 18a formed in the circuit board 18. Alternatively, a guiding disk portion 2a fitted into a mounting hole 21a formed in the housing body 21, as shown in FIG. 15, may be provided on the bottom plate of the inflator 2. These arrangements facilitate automation of assembly.

After the igniter 8 and the ECU 4 are connected in the above manner, the pad 6 is installed over the folded airbag 3 so as to engage the barb-like protrusions formed on the housing body 21 of the ECU 4 with the holes 6a formed in the pad 6 (see FIG. 16). Finally, the cover 22 is fixed to the housing body 21 using the screws to thereby complete the airbag safety module 1.

To install the airbag safety module 1, it is first placed on the steering wheel 5 and then fixed thereon by fastening bolts 31, as shown in FIG. 16, through a frame, or steering wheel spokes into the mounting portions 21c of the housing body 21 of the ECU 4. In order to improve the transmission of acceleration acting on the vehicle body to the electronic acceleration sensor 14 and the mechanical acceleration sensor 15 disposed within the ECU 4, (i.e., device sensitivity) increased rigidity of the housing body 21 of the ECU 4 is provided by direct mounting onto the steering wheel 5.

To ensure the gauges or the like mounted on an instrument are clearly visible through the steering wheel 5, the installation area of the airbag safety module 1 (i.e., a projected area of the pad 6) on the steering wheel 5 is preferably minimized. For example, a decreased installation area is accomplished by changing mounting orientation of the inflator 2 according to spoke configuration of the steering wheel 5.

In the airbag safety module 1 of the present invention, the depth of the space for mounting the safety module 1 (i.e., the height of the module 1 from the upper surface of the pad 6 to the bottom of the steering wheel 5) is reduced, as can be seen from the above, by mounting the inflator 2 directly on the ECU 4. In addition, the mounting of the pad 6 on the ECU 4 by engaging the barb-like protrusions 21b of the housing body 21 with the holes 6a of the pad 6 decreases the number of required parts and the number of assembly steps. This decreases of the manufacturing costs of the airbag safety module 1.

Figure 17:
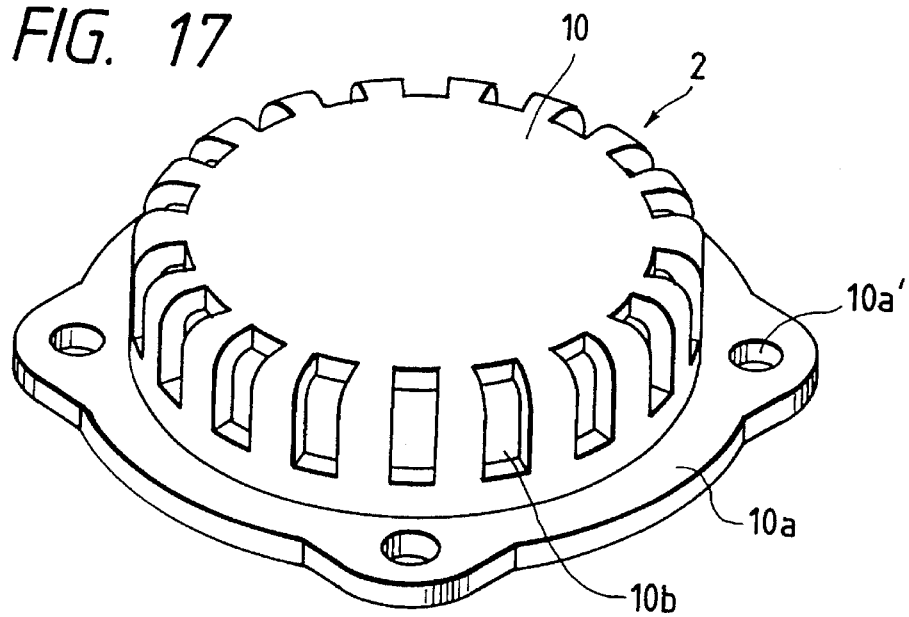
FIG. 17 is a perspective view which shows an alternative cover of an inflator.

Referring to FIG. 17, there is shown a modification of the casing 10 of the inflator 2.

Since the casing 10 of the inflator 2, as explained above, has the plurality of the gas outlets 10b formed around its side wall, a drilling process is required after a forming the casing 10. Accordingly, the gas outlets 10b preferably extend to the upper wall of the casing 10 to permit the casing to be cast in a single process. It will be appreciated that the illustrated structure of the casing 10 eliminates the need for drilling, thereby lowering manufacturing costs.

Figure 18:
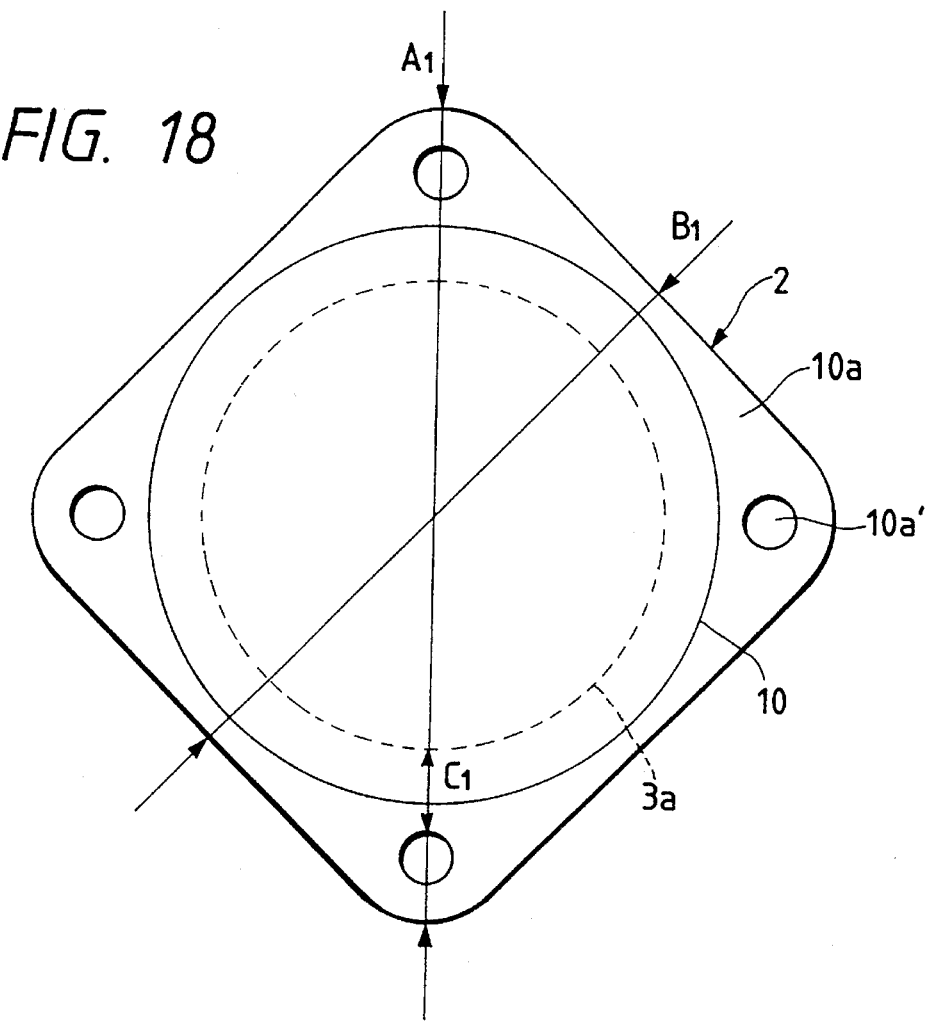
FIG. 18 is a plan view which shows a modified form of a flange of an inflator.

FIG. 18 shows a second modification of the flange 10a of the inflator 2.

The flange 10a illustrated in FIG. 18 is of generally rectangular configuration defined by the diagonal dimension A1, which is generally equal to the diameter of the circular flange 10a, as discussed above, and the side dimension B1 smaller than the diameter of the circular flange A for providing a compact structure. The rectangular configuration of the flange 10a permits the inflator 2 to be easily inserted into the airbag 3. Additionally, it makes it possible to reduce the size of inflator insertion hole 3a for increasing the space C1 between the inflator insertion hole 3a and the bolt holes 3b (i.e., the bolt holes 10a' of the flange 10a). Thus, the retaining force of the airbag 3 may be increased to prevent the airbag from being broken.

Figure 19:
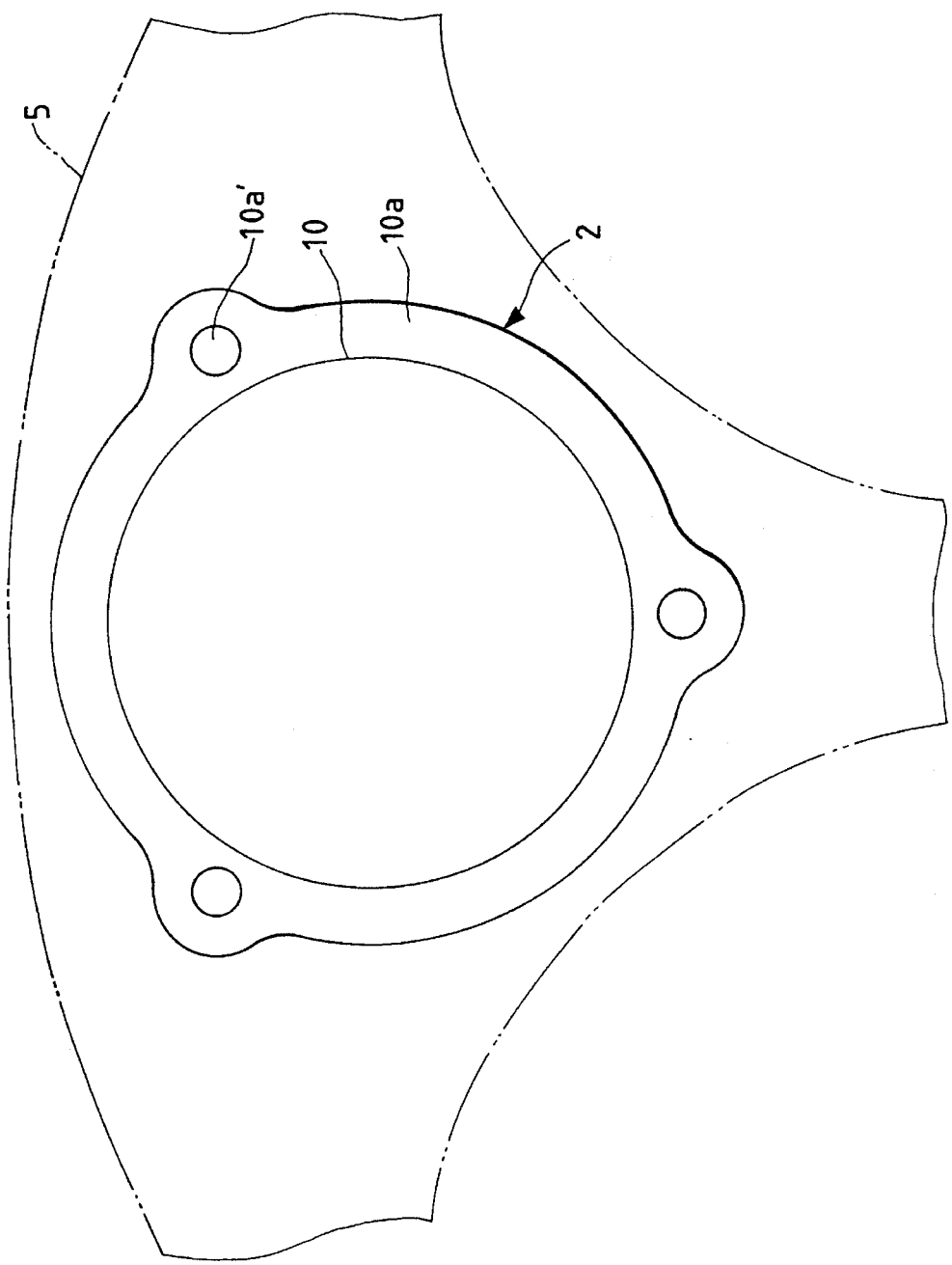
FIG. 19 is a plan view which shows a modified form of a flange of an inflator suitable for installation on a steering wheel with three spokes.

FIG. 19 shows another modification of the flange 10a of the inflator 2.

Flange 10a of the inflator 2 has three bolt holes 10a' formed therein for compact and light-weight structure. With this structure, the projected area of the pad 6 may be decreased to improve the visibility of gauges and dials mounted on the instrument panel of the vehicle. FIG. 19 illustrates an example of flange 10a mounted on the steering wheel 5 with three spokes.

Figure 20A:
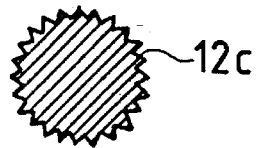
FIG. 20(a) is cross-sectional view of a bolt attached to a flange of an inflator, taken along line G—G in FIG. 20(b).
Figure 20B:
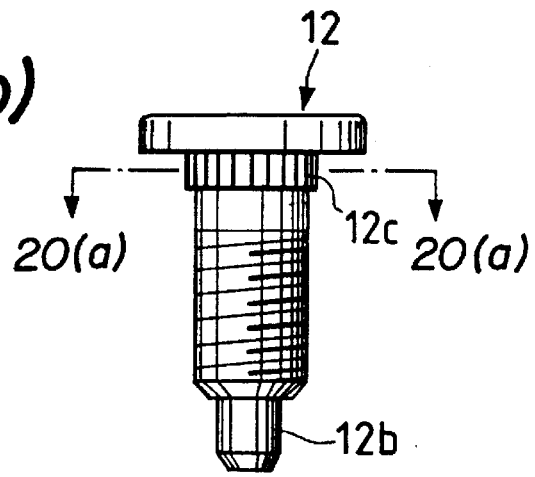
FIGS. 20(b) and 21 are side views which show modifications of a bolt attached to a flange of an inflator, respectively.

FIGS. 20(a) and 20(b) illustrate a modification of the bolt 12 attached to the flange 10a of the inflator 2.

Figure 21:
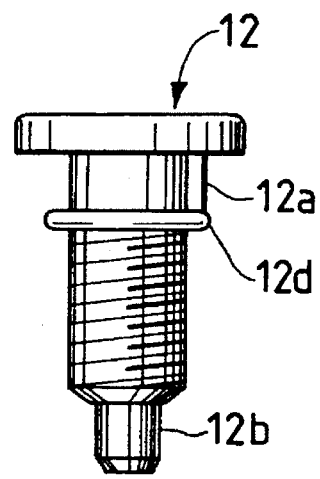

The illustrated bolt 12 includes a toothed washer portion 12c beneath a bolt head. The toothed washer portion 12c has a corrugated or notched peripheral surfaces formed in its outer surface for locking the bolt 12 in the bolt hole 10a' of the flange 10a. In addition, a flange portion 12d, as shown in FIG. 21, may be formed on a peripheral wall of the bolt 12 for preventing the bolt from being axially from the flange 10a. This eliminates the need for welding the bolts 12 to the flange 10a after the bolts 12 are press-fitted into the bolt holes 10a'.

Figure 22:
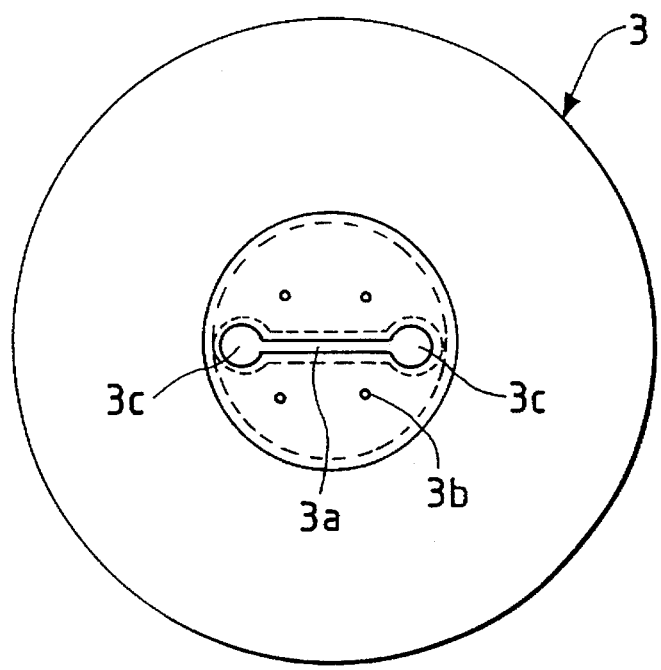
FIG. 22 is a bottom plan view which shows a modified form of a bottom of an airbag mounted to an ECU.

FIG. 22 shows a modification of the airbag 3.

The airbag 3 illustrated on FIG. 22 has an elongated opening which combines the inflator insertion hole 3a with the gas outlets 3c. The inflator 2 can be inserted into the airbag 3 using the gas outlets 3c as part of the inflator insertion hole 3a. Therefore, the inflator insertion hole 3a may be reduced in size to thereby increase a retaining area of the airbag 3, and to increase intervals between the inflator insertion hole 3a and the bolt holes 3b to enhance a retaining force to retain the airbag 3 on the ECU 4. In addition, a single sheet of reinforcing fabric may be stitched over the gas outlets 3c and the inflator insertion hole 3a for reducing the number of manufacturing processes.

Figure 23:
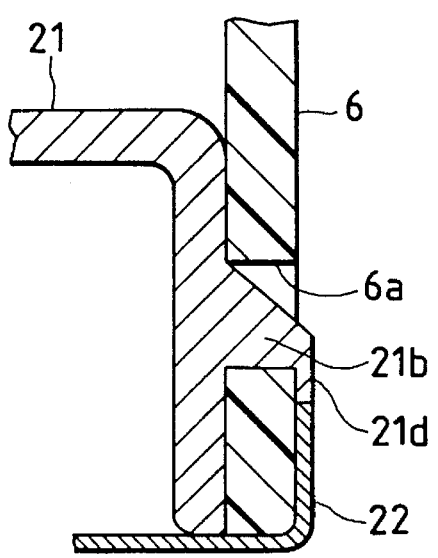
FIGS. 23 to 26 are partially cross-sectional views which respectively show modifications of a barb-like protrusion, formed on a housing of an ECU, engaging an opening formed in a side wall of a cover.

FIG. 23 shows a modification of the barb-like protrusions 21b formed on the housing body 21 of the ECU 4.

In this modification, each protrusion 21b further includes a hook-like extension 21d oriented downward, as viewed in the drawing from the tapered surface. When the pad 6 is mounted on the housing body 21, the hook-like extensions 21d project outward from the holes 6a of the pad 6 to hold the side wall of the pad 6. This restricts the end of the pad 6 from expanding outward when the airbag 3 is inflated to thereby prevent the disengagement of the pad 6 from the housing body 21.

Figure 24:
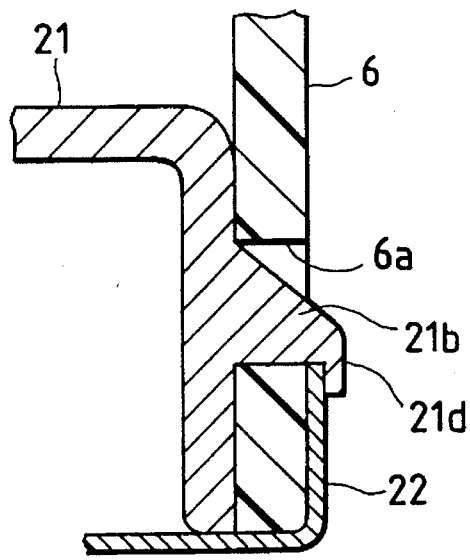

FIG. 24 shows a second modification of the barb-like protrusions 21b formed on the housing body 21 of the ECU 4.

Each protrusion 21*b*, similar to the above modification, includes a hook-like extension 21*d* extending parallel to the side wall of the housing body 21. When the pad 6 is mounted on the housing body 21, each hook-like extension 21*d* projects outside the cover 22 of the ECU 4 to hold part thereof together with the end portion of the pad 6.

Figure 25:
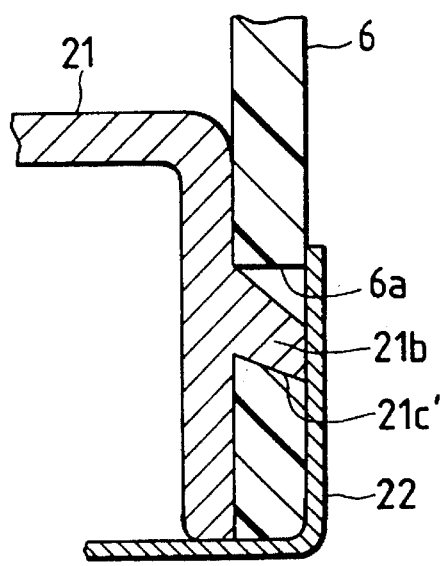

FIG. 25 shows a third modification of the barb-like protrusions 21*b* formed on the housing body 21 of the ECU 4.

Each of the barb-like protrusions 21*b*, as can be seen from the drawing, has the height equal to the thickness of the side wall of the housing body 21 and includes a tapered surface 21*c'* on its lower portion. The tapered surface 21*c'* is inclined at a given angle to the side wall of the housing body 21. Similarly, a lower surface of each hole 6*a* of the pad 6 is contoured to the tapered surface 21*c'* of the protrusion 21*b*. Additionally, the end portion of the cover 22 of the ECU 4 extends upward, as viewed in the drawing, over the holes 6*a* of the pad 6. With these arrangements, tight engagement of the barb-like protrusions 21*b* of the housing body 21 with the holes 6*a* of the pad 6 is established without need of the hook-like extensions 21*d*, as shown in FIGS. 23 and 24.

Figure 26:
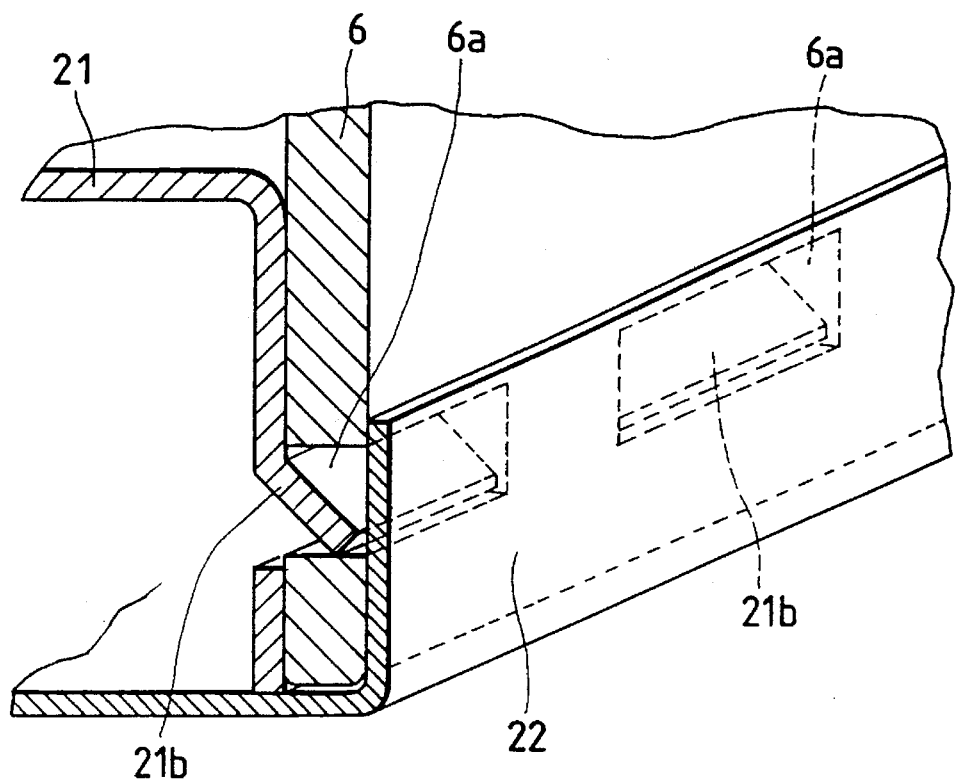

FIG. 26 shows a fourth modification of the barb-like protrusions 21*b* formed on the housing body 21 of the ECU 4.

The barb-like protrusions 21*b* are formed by bending portions of the side wall of the housing body 21 outwardly at a given angle to elastically engage with the holes 6*a* formed in the pad 6. The end portion of the cover 22 of the ECU 4 extends over the holes 6*a*.

FIG. 27 shows a modified form of the attachment of the airbag 3 to the ECU 4.

The housing body 21 of the ECU 4, as clearly from the drawing, forms therein a relatively greater mounting hole 21*a* as compared with the above embodiment. The inflator 2 is secured to the ECU 4 with the opening edge (i.e., the seams 3*d*) around the inflator insertion hole 3*a* of the airbag 3 being sandwiched inside the mounting hole 21*a*. Alternatively, a recessed portion 32, as shown in FIG. 14, may be formed in the bottom plate 11 of the inflator 2 to receive therein the swelled seams 3*d* around the inflator insertion hole 3*a* of the airbag 3 for holding the airbag 3 between the inflator 2 and the ECU 4 under uniform pressure.

Figure 28:
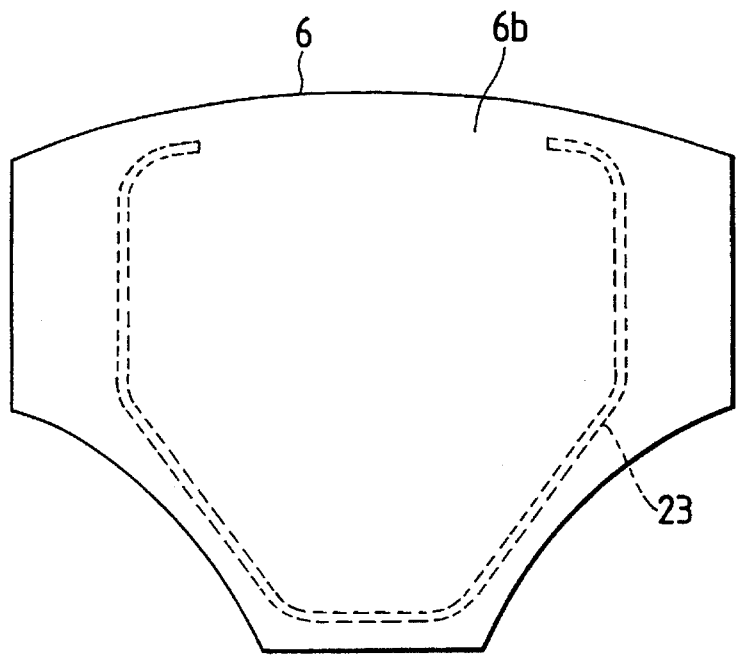
FIG. 28 is a plan view which shows a modified form of a rip groove formed in an outer wall of a cover.

FIG. 28 shows a modification of the pad 6 which has formed therein a substantially U-shaped rip groove 23. The rip groove 23, as shown in the drawing, so extends continuously around the outer wall 6*b* of the pad 6 that it permits the outer wall 6*b* inside the rip groove 23 to be faithfully removed upon inflation of the airbag 3 even when the outer wall 6*b* has a uniform thickness.

Figure 29:
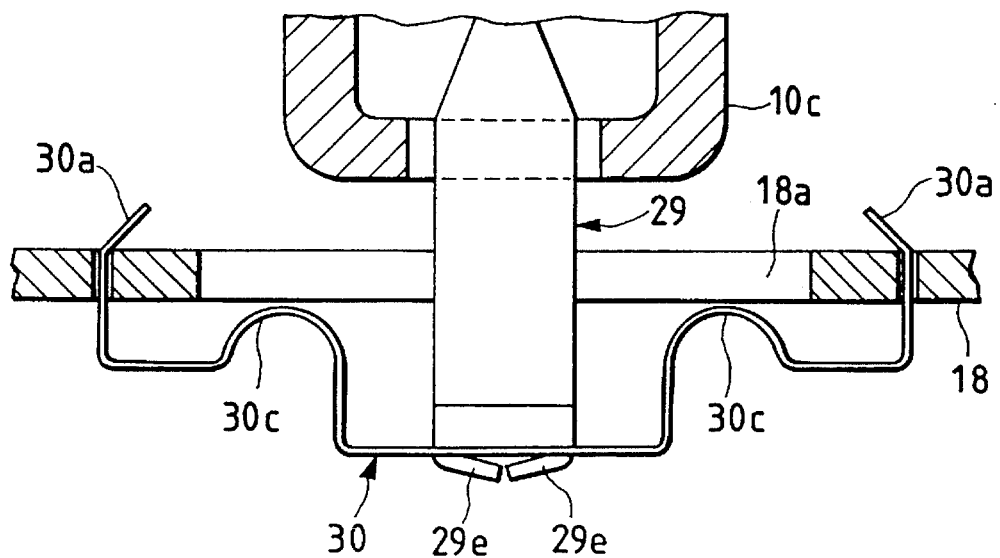
FIG. 29 is a partially cross-sectional view which shows a modified form of terminals connecting an igniter of an inflator with an ECU.

FIG. 29 shows a modification of the terminals 30 (only one is shown) of the circuit board 18 of the ECU 4. The terminal 30 extends over the window 18*a* of the circuit board 18 and is secured to the circuit board 18 through the connecting leg portions 30*a* diametrically opposed to each other over the window 18*a*. The terminal 30 is made of a strip plate having a pair of curved portions 30*c* elastically deformable for absorbing stress caused by misalignment with the terminal 29 connected to the igniter 8. The curved portions 30*c*, as seen in the drawing, project toward the window 18*a* of the circuit board 18 so that they do not interfere with the circuit board 18. Additionally, each terminal 29 connected to the igniter 8 includes forked extensions 29*e*. The forked extensions 29*e* are inserted into the terminal 30 and then crimped inward for assuring electric communication between the igniter 8 and the ECU 4. It is advisable that after having been crimped, the forked extensions 29*e* be soldered.

Figure 30:
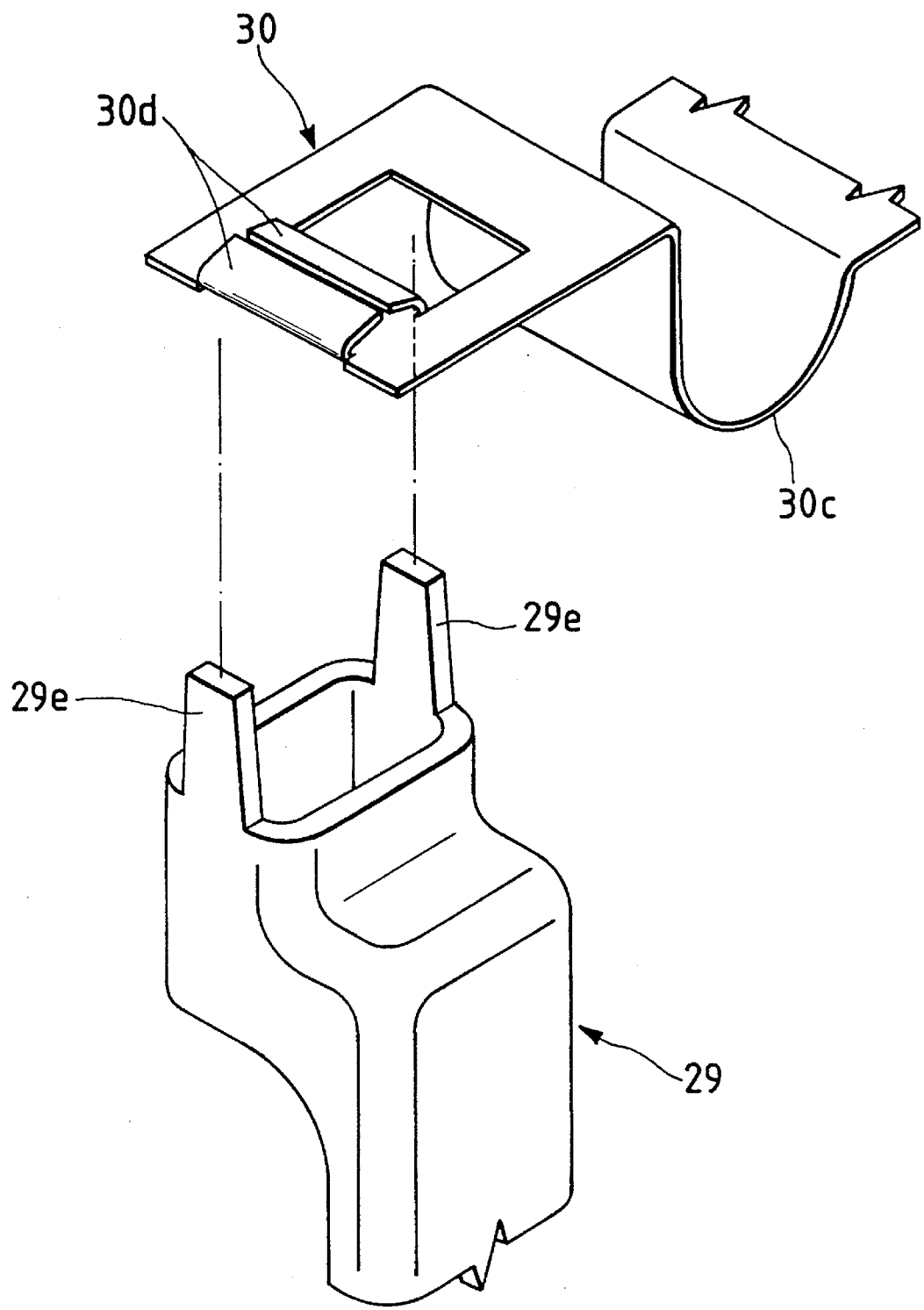
FIG. 30 is a partially perspective view which shows a modified form of connection between terminals connecting an igniter of an inflator with an ECU.
Figure 31:
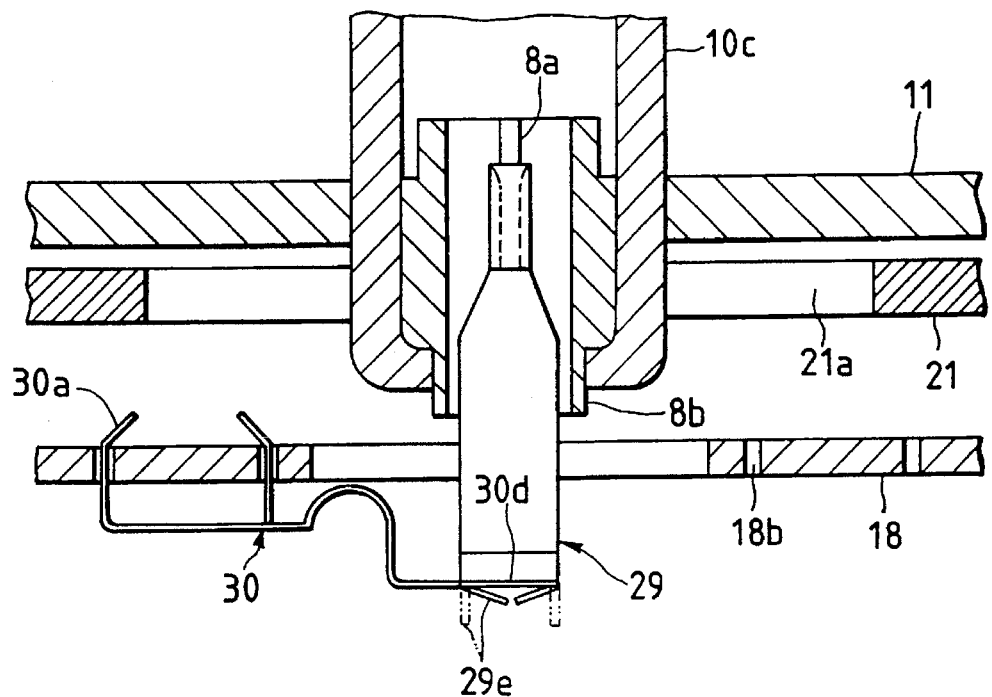
FIG. 31 is a partially cross-sectional view which shows the connection between the terminals, as shown in FIG. 30.

FIG. 30 shows a modified form of the connection between the terminals 30 connected to the circuit board 18 and the terminal 29 connected to the igniter 8. Each terminal 30 includes a pair of return bent portions 30*d* to form a double-walled end. The terminal 29 includes forked extensions 29*e*, similar to those shown in FIG. 28, which are, as shown in FIG. 31, crimped over the return bent portions 30*d* of the terminal 30 for assuring electric communication between the igniter 8 and the ECU 4. It is preferable that the forked extensions 29*e* be soldered after having been crimped.

Figure 32:
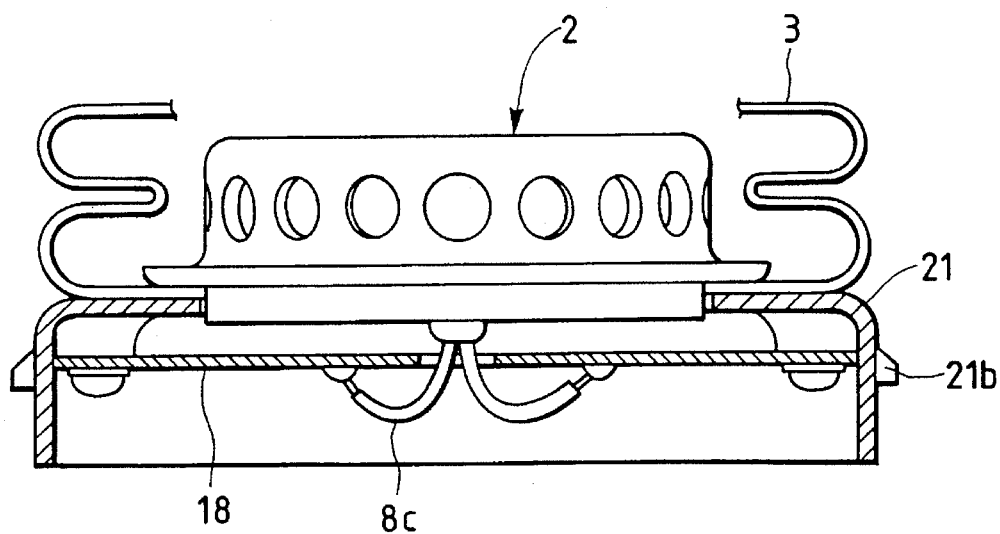
FIG. 32 is a cross-sectional view which shows electric communication between an inflator and an ECU using lead wires.

Referring to FIG. 32, a different type of electric connection between the inflator 2 (i.e., the igniter 8) and the circuit board 18 of the ECU 4, using lead wires 8*c*, is shown. The lead wires 8*c* are connected at their ends to the igniter 8 of the inflator 2, while the other ends thereof are soldered directly on the circuit board 18 of the ECU 4. Alternatively, the lead wires 8*c* may be soldered to the terminals 30 connected to the circuit board 18.

Figure 33:
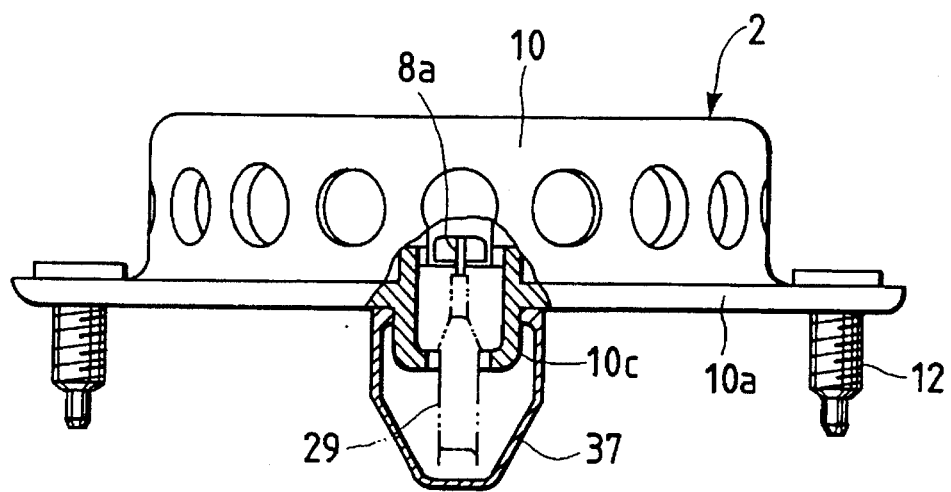
FIG. 33 is a partially cross-sectional view which shows a cap covering terminals electrically connecting an inflator and an ECU.

FIG. 33 shows a variant of the inflator 2 which includes a cap 37 for providing the protection of the terminals 8*a* of the igniter 8. The cap 37 is made of a conductive resin for preventing electric current from being applied between the terminals 8*a*. The cap 37 may be mounted on the inflator 2 only during transportation. Alternatively, the inflator 2 with the cap 37 may be inserted into the airbag 3 for protecting the terminals 8*a* of the igniter 8. Therefore, it is preferable to make a surface of the cap 37 smooth without any hitch for easy insertion of the inflator into the airbag 3.

Figure 34:
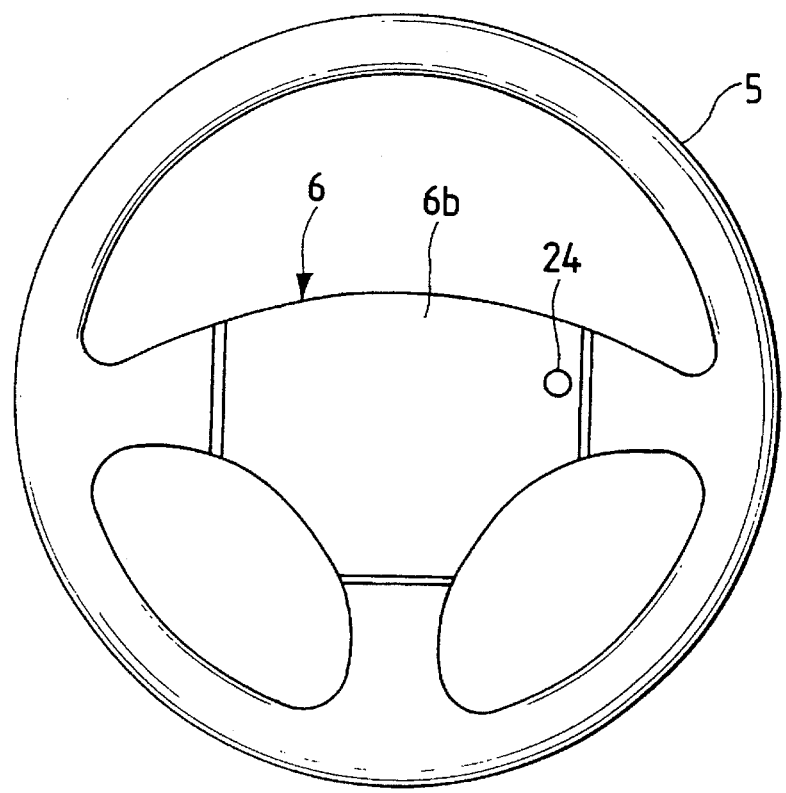
FIG. 34 is a plan view which shows a steering wheel with a single alarm lamp informing a driver of occurrence of a system failure.

Referring to FIG. 34, a single alarm lamp 24 is installed in the outer wall 6*b* of the pad 6 which is designed to be turned on when either one of the airbag safety modules 1 mounted on the driver's side and the front passenger's side malfunctions. In addition, the alarm lamp may emit light of different colors to indicate which the airbag safety modules 1 for the driver and the front passenger is malfunctioning. Alternatively, it is possible to change a lighting time period during which the alarm lamp 24 is turned on or a flashing cycle (i.e., a ratio of on-time to off-time of the alarm lamp) for indicating which the airbag safety modules 1 for the driver and the front passenger is malfunctioning.

Figure 35:
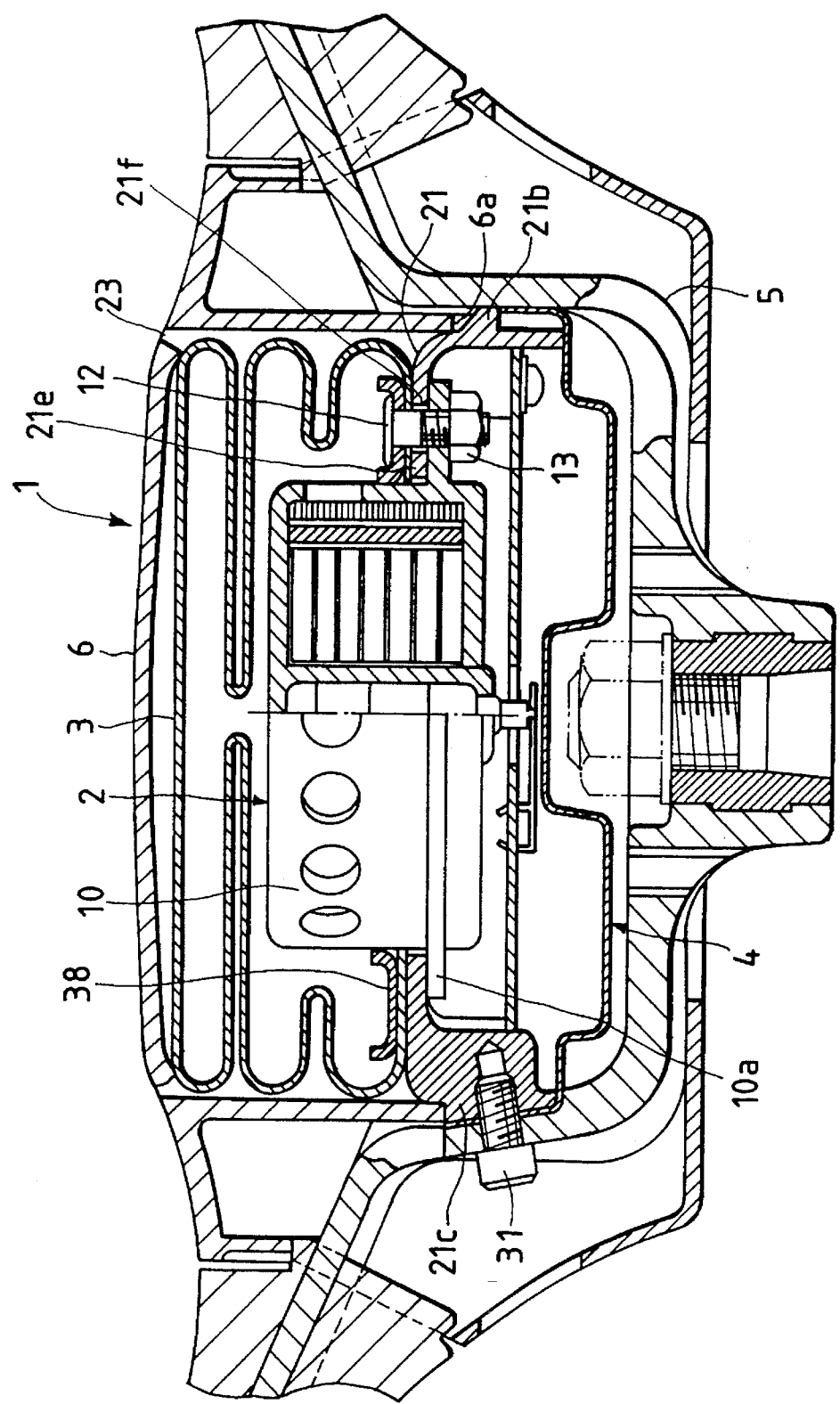
FIG. 35 is a cross-sectional view which shows an alternative airbag safety module for automotive vehicles according to the present invention.

Referring to FIG. 35, there is shown an alternative airbag safety module 1. This airbag safety module 1 is not of the type wherein the inflator 2 which has been inserted into the airbag 3 is mounted on the ECU 4, but the type wherein the inflator 2 is inserted into the airbag 3 from the inside of the housing body 21 of the ECU 4. Therefore, in the central portion of the upper base wall of the housing body 21 of the ECU 4, an opening 21*e* is formed which has a size sufficient for allowing the case 10 of the inflator 2 to be inserted into the airbag 3. Formed around the opening 21*e* are a plurality of bolt holes 21*f* for receiving the bolts 12. The flange 10*a* is secured to the inner surface of the upper wall of the housing body 21 of the ECU 4 by fastening the nuts 13 to the bolts 12. The airbag 3 is secured on the ECU 4 with the peripheral portion of the inflator insertion hole 3*a* (see FIG. 6) being sandwiched between a circular retainer 38 and the housing body 21.

The inflator 2 and the airbag 3 are fixed on the housing body 21 of the ECU 4 by inserting the bolts 12 attached to the retainer 38 into the bolt holes 3*b* (see FIG. 6) around the inflator insertion holes 3*a* of the airbag 3, the mounting holes of the housing 21, and the bolt holes 10*a'* formed in the flange 10*a* (see FIG. 2) and then tightening the nuts 13 to the bolts 12.

The securement of the pad 6 to the ECU 4 is accomplished in the same manner as the above embodiment to engage the barb-like protrusions 21b provided on the housing body 21 with the holes 6a formed in the pad 6. For mounting the airbag safety module 1 on the steering wheel 5, the mounting portion 21c of the housing body 21 of the ECU 4 are, as shown in FIG. 16, fixed to the steering wheel 5 by tightening the bolts 31 from the underside of the steering wheel 5.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An airbag safety module for a vehicle, comprising:
   an inflatable airbag;
   an inflator responsive to an airbag control signal to generate gas for inflating said airbag;
   an airbag control unit operable to provide the airbag control signal to said inflator in response to impact acting on a vehicle body;
   a cover including a base wall and a side wall continuing from said base wall of said cover, said cover at least partially enclosing said airbag, said inflator, and said airbag control unit therein;
   a housing having a base wall and a side wall extending from said base wall of said housing, wherein said airbag control unit is disposed in a space defined by said base and side walls of said housing, wherein said airbag and said inflator are mounted on said base wall of said housing; and
   means for fixedly coupling said cover to said housing, consisting of:
   a plurality of protrusions provided on said side wall of said housing;
   a plurality of openings formed in said side wall of said cover, wherein said protrusions are engagingly disposed in said openings; and
   a bottom cover engaged with said housing on a side of said housing opposite from said airbag, said bottom cover having an edge portion which overlaps a portion of said side wall of said housing with a portion of said side wall of said cover being pressingly disposed therebetween.

2. An airbag safety module as set forth in claim 1, wherein each of the protrusions of said housing has a tapered surface formed thereon to allow said housing to be inserted into said cover in an assembly direction to engage one of the openings of said cover.

3. An airbag safety module as set forth in claim 1, wherein each of the protrusions formed on said housing is shaped to allow said cover to be elastically deformed upon insertion of said housing into the cover in an assembly direction to establish tight engagement with one of the openings of said cover.

4. An airbag safety module as set forth in claim 1, wherein said airbag is retained on the base wall of said housing with part of said airbag being sandwiched between said housing and said inflator.

5. An airbag safety module as set forth in claim 4, wherein said airbag includes an opening, a peripheral portion of said airbag around the opening being retained on the base wall of said housing by the inflator from the inside of said airbag.

6. An airbag safety module as set forth in claim 5, wherein the opening of said airbag is formed with an elongated hole for insertion of said inflator into said airbag, said elongated hole having gas outlets formed in both end portions thereof.

7. An airbag safety module as set forth in claim 1, wherein said airbag includes an opening, an inner surface of a peripheral portion around the opening of said airbag being secured on the base wall of said housing using a retainer.

8. An airbag safety module as set forth in claim 1, wherein each of the openings of said cover includes a tapered surface, each of the protrusions formed on said housing having a surface inclined at a given angle to engage the tapered surface of a corresponding one of the openings for restricting said cover from being disengaged from said housing in a disassembly direction.

9. An airbag safety module as set forth in claim 1, wherein each of said protrusions formed on said side wall of said housing includes an extension which, when said plurality of protrusions are engaged with said plurality of openings, projects from a respective said opening of said cover over an outer surface of the side wall of said cover.

10. An airbag safety module as set forth in claim 1, wherein the side wall of said housing is secured on a steering wheel spoke of the vehicle using a fastener.

11. An airbag safety module as set forth in claim 1, wherein said housing has an opening formed In a portion of the base wall on which said inflator is mounted, said airbag control unit electrically communicating with a squib disposed in said inflator through lead wires.

12. An airbag safety module as set forth in claim 1, wherein the base wall of said cover is exposed to a cabin of the vehicle, an outer face of the base wall having provided therein at least one alarm lamp connected to said airbag control unit to provide an alarm signal when the airbag safety module malfunctions.

13. An airbag safety module as set forth in claim 12, wherein the at least one alarm lamp is optically connected to a light-emitting element incorporated in said airbag control unit to provide the alarm signal in the form of light transmitted from the light-emitting element when the airbag safety module malfunctions.

14. An airbag safety module as set forth in claim 1, wherein the base wall of said cover continuing from the side wall has a rip groove formed in a connecting portion to the side wall to rip the base wall out of said cover upon inflation of the airbag.

15. An airbag safety module as set forth in claim 14, wherein the connecting portion of an outer side of the base wall of the cover is curved toward the side wall.

16. An airbag safety module as set forth in claim 15, wherein the rip groove is formed in a substantially H pattern.

17. An airbag safety module as set forth in claim 15, wherein the rip groove is formed in a substantially U pattern.

18. An airbag safety module as set forth in claim 1, wherein said inflator includes an extension, said housing having an opening defined therein to engage the extension of said inflator for alignment between said inflator and said housing.

19. An airbag safety module as set forth in claim 1, wherein said inflator includes an inflator casing having a guiding portion formed thereon, said housing having a mounting hole formed in the base wall engageble with the guiding portion for assuring alignment between said inflator and said housing.

20. An airbag safety module as set forth in claim 1, wherein said inflator includes an inflator casing having a side wall and an upper wall contiguous therewith, the inflator casing having a plurality of gas outlets formed therein to eject gas into said airbag when the inflator is activated, each gas outlet extending from the side wall to a portion of the upper wall.

21. An airbag safety module as set forth in claim 1, wherein said inflator includes:

a flange having a bolt hole formed therethrough; and a bolt threaded through said bolt hole to mount said inflator on the base wall of said housing.

22. An airbag safety module as set forth in claim 21, wherein the bolt has a key formed thereon and is press-fitted into a bolt hole formed in the flange.

23. An airbag safety module as set forth in claim 21, wherein the bolt having a small-diameter end portion for guiding insertion of a nut when said inflator is mounted on said housing.

24. An airbag safety module as set forth in claim 23, wherein the small-diameter end portion is chamfered.

25. An airbag safety module as set forth in claim 23, wherein the small-diameter end portion is rounded.

26. An airbag safety module as set forth in claim 21, wherein the bolt has a toothed washer portion formed thereon for locking the bolt in the bolt hole of the flange.

27. An airbag safety module as set forth in claim 21, wherein the bolt has a flange portion formed on a peripheral wall thereof for preventing the bolt from being dislodged from the bolt hole of the flange.

28. An airbag safety module as set forth in claim 1, wherein said airbag includes an opening, a reinforcing cloth being stitched on a peripheral portion around the opening of said airbag, said airbag being retained on the base wall of said housing by the inflator with the reinforcing cloth-stitched portion of the airbag arranged inside an opening formed in the base wall of said housing.

29. An airbag safety module for a vehicle, comprising:

an inflatable airbag;

an inflator responsive to an airbag control signal to generate gas for inflating said airbag;

an airbag control unit operable to provide the airbag control signal to said inflator in response to impact acting on a vehicle body;

a cover including a base wall portion and a side wall portion continuing from said base wall portion of said cover, at least partially enclosing said airbag, said inflator, and said airbag control unit therein, said side wall portion of said cover having a plurality of openings formed therein; and a housing having a base wall portion and a side wall portion extending from said base wall portion of said housing, wherein said airbag control unit is disposed in a space defined by said base and side wall portions of said housing, wherein said airbag and said inflator are mounted on said base wall portion of said housing, wherein a plurality of protrusions are provided on said side wall portion of said housing, wherein said protrusions are engagingly disposed in said plurality of openings to fixedly couple said cover to said housing, wherein each said protrusion is provided with an extension portion which, when said plurality of protrusions are engagingly disposed in said plurality of openings, projects from a respective said opening of said side wall portion of said cover over an outer surface of said cover, each said extension portion holding an end portion of a bottom plate of said housing onto the outer surface of said side wall portion of said cover.

30. An airbag safety module for a vehicle, comprising:

an inflatable airbag;

an inflator responsive to an airbag control signal to generate gas for inflating said airbag;

an airbag control unit operable to provide the airbag control signal to said inflator in response to impact acting on a vehicle body;

a cover including a base wall portion and a side wall portion continuing from said base wall portion of said cover, at least partially enclosing said airbag, said inflator, and said airbag control unit therein, said side wall portion of said cover having a plurality of openings formed therein; and a housing having a base wall portion and a side wall portion extending from said base wall portion of said housing, wherein said airbag control unit is disposed in a space defined by said base and side wall portions of said housing, wherein said airbag and said inflator are mounted on said base wall portion of said housing, wherein said housing has an opening opposite said base wall portion and a bottom plate covering said opening opposite said base wall portion, wherein an edge portion of said bottom plate extends over said side wall portion of said cover to thereby hold said cover onto said side wall portion of said housing, wherein a plurality of protrusions are provided on said side wall portion of said housing, wherein said plurality of protrusions are engagingly disposed in said plurality of openings to thereby fixedly couple said cover to said housing.

31. An airbag safety module for a vehicle, comprising:

an inflatable airbag;

an inflator responsive to an airbag control signal to generate gas for inflating said airbag, wherein said inflator includes a storage cylinder housing an ignition squib and an extension extending from said storage cylinder;

an airbag control unit operable to provide the airbag control signal to said inflator in response to impact acting on a vehicle body, said airbag unit including a circuit board;

a cover including a base wall portion and a side wall portion continuing from said base wall portion of said cover, at least partially enclosing said airbag, said inflator, and said airbag control unit therein, said side wall portion of said cover having plurality of openings formed therein; and a housing having a base wall portion and a side wall portion extending from said base wall portion of said housing, wherein said airbag control unit is disposed in a space defined by said base and side wall portions of said housing, wherein said airbag and said inflator are mounted on said base wall portion of said housing, said housing having an opening defined therein to engage said extension of said inflator to thereby align said inflator and said housing, said housing also having said circuit board of said airbag control unit arranged therein, wherein a plurality of protrusions are provided on said side wall portion of said housing, wherein said protrusions are engagingly disposed in said openings to thereby fixedly couple said cover to said housing.

32. An airbag safety module for a vehicle, comprising:

an inflatable airbag;

an inflator responsive to an airbag control signal to generate gas for inflating said airbag, said inflator including an ignition squib, said ignition squib having first terminals attached thereto;

an airbag control unit operable to provide the airbag control signal to said inflator in response to impact acting on a vehicle body, said airbag control unit being provided with second terminals, said first terminals of said inflator being connected to said airbag control unit via second terminals, each of said first and second terminals having a flexible portion to compensate for physical misalignment between said first and second terminals;

a cover including a base wall portion and a side wall portion continuing from said base wall portion of said cover, at least partially enclosing said airbag, said inflator, and said airbag control unit therein, said side wall portion of said cover having a plurality of openings formed therein; and a housing having a base wall portion and a side wall portion extending from said base wall portion of said housing, wherein said airbag control unit is disposed in a space defined by said base and side wall portions of said housing, wherein said airbag and said inflator are mounted on said base wall portion of said housing, wherein a plurality of protrusions are provided on said side wall portion of said housing, wherein said protrusions are engagingly disposed in said openings to thereby couple said cover to said housing.

33. An airbag safety module as set forth in claim 32, wherein each flexible portion of each second terminal is provided with a curved portion.

34. An airbag safety module as set forth in claim 32, wherein the first terminals are secured to the second terminals by crimping end portions of the first terminals on the second terminals.

35. An airbag safety module as set forth in claim 32, wherein each of the second terminals has an end portion thereof folded to form a double-walled portion engaging with the corresponding first terminal.

* * * * *